United States Patent
Shinkai

(10) Patent No.: US 7,853,127 B2
(45) Date of Patent: Dec. 14, 2010

(54) EQUIPMENT AND METHOD FOR INFORMATION PROCESSING, RECORDING MEDIUM, AND PROGRAM

(75) Inventor: Mitsutoshi Shinkai, Kanagawa (JP)

(73) Assignee: Sony Corporation, Tokyo (JP)

(*) Notice: Subject to any disclaimer, the term of this patent is extended or adjusted under 35 U.S.C. 154(b) by 998 days.

(21) Appl. No.: 10/877,870

(22) Filed: Jun. 25, 2004

(65) Prior Publication Data

US 2004/0263682 A1    Dec. 30, 2004

(30) Foreign Application Priority Data

Jun. 26, 2003   (JP)   .......................... P2003-182001

(51) Int. Cl.
*H04N 5/91* (2006.01)
*H04N 7/00* (2006.01)

(52) U.S. Cl. .................................. 386/131; 386/95
(58) Field of Classification Search .............. 386/52, 386/96, 97, 129, 131, 95; 348/558
See application file for complete search history.

(56) References Cited

U.S. PATENT DOCUMENTS

| | | | | |
|---|---|---|---|---|
| 6,104,861 A | * | 8/2000 | Tsukagoshi | 386/95 |
| 6,504,993 B1 | * | 1/2003 | Matsumoto | 386/95 |
| 6,618,547 B1 | * | 9/2003 | Peters et al. | 386/52 |
| 2004/0247284 A1 | * | 12/2004 | Yamasaki | 386/52 |
| 2006/0280479 A1 | * | 12/2006 | Mita et al. | 386/96 |

FOREIGN PATENT DOCUMENTS

| | | |
|---|---|---|
| JP | 8 329611 | 12/1996 |
| JP | 10 304376 | 11/1998 |
| JP | 2001 157112 | 6/2001 |
| JP | 2002-125192 | * 4/2002 |
| JP | 2002 125192 | 4/2002 |

* cited by examiner

*Primary Examiner*—Thai Tran
*Assistant Examiner*—Hung Q Dang
(74) *Attorney, Agent, or Firm*—Frommer Lawrence & Haug LLP; William S. Frommer; Thomas F. Presson

(57) ABSTRACT

An device and method for changing frame rates of video signals. When 60*i* moving image data is generated from 24*p* moving image data, the phase of the top frame (hereafter, referred to as "A-frame") within a pull down cycle is recorded. In a reverse operation, the repeat fields and the like can be identified with accuracy based on the recorded A-frame phase and 60*i* time code.

9 Claims, 26 Drawing Sheets

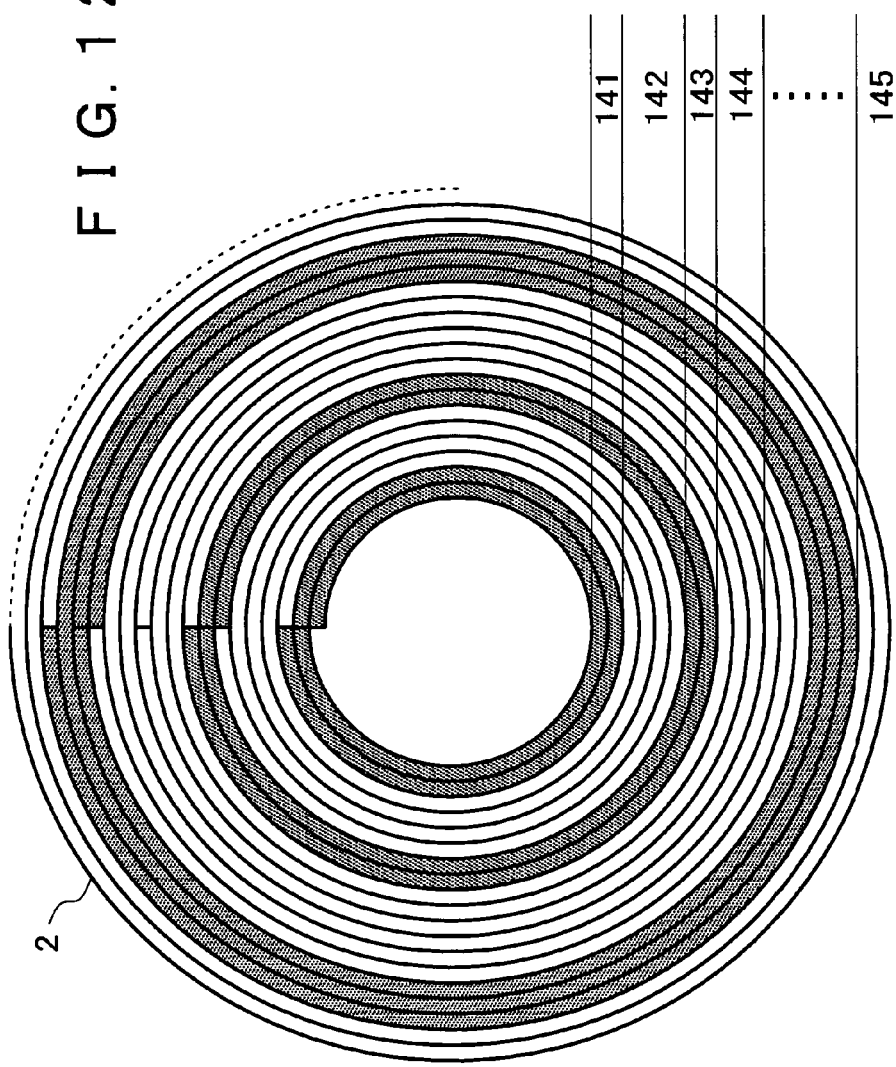

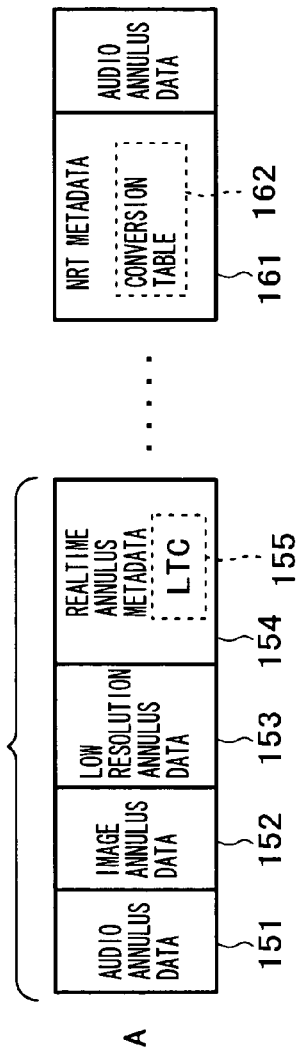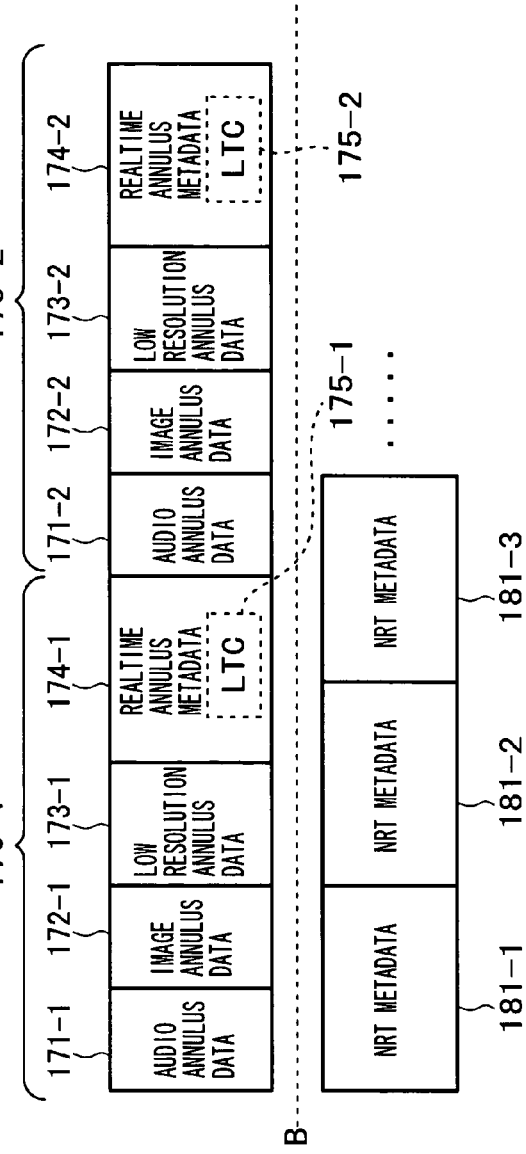

FIG. 18

```
1  <?xml version="1.0" encoding="UTF-8"?>
2  <NonRealTimeMeta
3   xmlns="urn:schemas-proressionalDisc:nonRealTimeMeta"
4   xmlns:lib="urn:schemas-professionalDisc:lib"
5   xmlns:xsi="http://www.w3.org/2001/XMLSchema-instance"
6   xsi:schemaLocation="urn:schemas-professionalDisc: nonRealTimeMeta
7   ¥NonRealTimeMeta.xsd">
8
9    <TargetMaterial
10     umidRef="060A2B3401010105010100D12130000000000010444444484EEEE00E0188E130B"
11     status="OK"/>
12   <Duration value="500"/>
13   <LtcChangeTable tcFps="30">
14     <LtcChange frameCount="0"  value="55300201" status="inc"/>
15     <LtcChange frameCount="3"  value="48252001" status="still"/>
16     <LtcChange frameCount="5"  value="48252001" status="irregular"/>
17     <LtcChange frameCount="6"  value="53001500" status="still"/>
18     <LtcChange frameCount="8"  value="42254315" status="irregular"/>
19     <LtcChange frameCount="11" value="43254315" status="inc"/>
20     <LtcChange frameCount="14" value="42254515" status="irregular"/>
21     <LtcChange frameCount="15" value="42254515" status="inc"/>
22     <LtcChange frameCount="17" value="42254515" status="irregular"/>
23     <LtcChange frameCount="18" value="42254515" status="inc"/>
24     <LtcChange frameCount="20" value="42254515" status="end"/>
25   </LtcChangeTable>
```

F I G. 1 9

```
1  <CreationDate isSummerTime="false" value="2002-10-01T12:34:56+09:00"/>
2  <LastUpdate isSummerTime="false" value="2002-10-01T23:45:01+09:00"/>
3  <TypicalUbit value="00008080ABCDEF98"/>
4  <KeyFrame frameCount="2"/>
5  <BodyUmidBasicChangeTable>
6      <BodyUmidBasicChange frameCount="100" status="start"
7          value="060A2B34010101050101010D1213000000000001011114111999908004668E130B"/>
8      <BodyUmidBasicChange frameCount="200" status="start"
9          value="060A2B34010101050101010D1213000000000001011114111999908004668E130B"/>
10     <BodyUmidBasicChange frameCount="300" status="start"
11         value="060A2B34010101050101010D1213000000000001011114111999908004668E130B"/>
12     <BodyUmidBasicChange frameCount="400" status="start"
13         value="060A2B34010101050101010D1213000000000001011114111999908004668E130B"/>
14     <BodyUmidBasicChange frameCount="500" status="start"
15         value="060A2B34010101050101010D1213000000000001011114111999908004668E130B"/>
16     <BodyUmidBasicChange frameCount="600" status="none"
17     <BodyUmidBasicChange frameCount="700" status="start"
18         value="060A2B34010101050101010D1213000000000001011114111999908004668E130B"/>
19 </BodyUmidBasicChangeTable>
20
21 <BodyUmidWhenChangeTable>
22     <BodyUmidWhenChange frameCount="200" status="inc" value="44915B004444484"/>
23     <BodyUmidWhenChange frameCount="299" status="irregular"
24         value="44915B004444484"/>
25     <BodyUmidWhenChange frameCount="300" status="inc" value="44915B003444484"/>
```

FIG. 20

```
1  <BodyUmidWhenChange frameCount="399" status="irregular"
2      value="44915B0024444484"/>
3  <BodyUmidWhenChange frameCount="400" status="none"/>
4  <BodyUmidWhenChange frameCount="500" status="inc" value="44915B0044444484"/>
5  <BodyUmidWhenChange frameCount="599" status="irregular"
6      value="44915B0024444484"/>
7  <BodyUmidWhenChange frameCount="600" status="none"/>
8  </BodyUmidWhenChangeTable>
9
10 <BodyUmidWhereChangeTable>
11   <BodyUmidWhereChange frameCount="200" status="start"
12      value="44915B0044444484443234343"/>
13   <BodyUmidWhereChange frameCount="300" status="none"/>
14   <BodyUmidWhereChange frameCount="500" status="start"
15      value="44915B0044444487443234343"/>
16   <BodyUmidWhereChange frameCount="600" status="none"/>
17 </BodyUmidWhereChangeTable>
18
19 <BodyUmidWhoChangeTable>
20   <BodyUmidWhoChange frameCount="200" status="start"
21      value="44915B0043444484443234343"/>
22   <BodyUmidWhoChange frameCount="300" status="start"
23      value="44915B0044441484443234343"/>
24   <BodyUmidWhoChange frameCount="400" status="none"/>
25   <BodyUmidWhoChange frameCount="500" status="start"
```

F I G. 21

```
1       value="44915B014444448443234343"/>
2     <BodyUmidWhoChange frameCount="400" status="none"/>
3   </BodyUmidWhoChangeTable>
4   <KlvPacketTable>
5     <KlvPacket frameCount="0"   status="spot"  key="060E2B34010101050301020A02000000"
6       lengthValue="095F52656353746172"/>
7     <KlvPacket frameCount="200" status="start" key="060E2B34010101030201020500000000"
8       lengthValue="054A6170616E"/>
9     <KlvPacket frameCount="300" status="none"/>
10    <KlvPacket frameCount="400" status="spot" key="060E2B34010101050301020A02000000">
11      lengthValue="830000065F466C617368"/>
12    <KlvPacket frameCount="500" status="spot" key="060E2B34010101050301020A02010000"
13      lengthValue="830000665E5672C8A9E"/>
14    <KlvPacket frameCount="600" statue="start" key="060E2B34010101030201020500000000"
15      lengthValue="025553"/>
16    <KlvPacket frameCount="700" status="none"/>
17    <KlvPacket frameCount="800" status="spot"
18      key="060E2B34010101050301020A02000000"
19      lengthValue="8300000075F5265563456E64"/>
20  </KlvPacketTable>
21  <VideoFormat>
22    <VideoRecPort port="SDTI-CP"/>
23    <VideoFrame videoCodec="IMK50" caputureFps="24p" recFps="59.94"
24       formatFps="59.94i"/>
25    <VideoLayout pixel="640" numOfVerticalLine="480" aspectRatio="4:3">
```

FIG. 22

```
1       <PullDownSetting pullDownKind="2-3" aFramePhase="00"/>
2     </VideoLayout>
3   </VideoFormat>
4   <AudioFormat numOfChannel="4">
5     <AudioRecPort port="ANALOG" audioCodec="LPCM16" trackDst="CH1"/>
6     <AudioRecPort port="ANALOG" audioCodec="LPCM16" trackDst="CH2"/>
7     <AudioRecPort port="ANALOG" audioCodec="LPCM16" trackDst="CH3"/>
8     <AudioRecPort port="ANALOG" audioCodec="LPCM16" trackDst="CH4"/>
9   </AudioFormat>
10  <Device manufacturer="sony" modelName="ABC-0123" serialNo="12345678">
11    <Element hardware="ABC-board 01" software="ABC-board driver v1.0"/>
12    <Element hardware="XYZ-board" software="XYZ-board driver v1.5"/>
13    <Element hardware="PQR-hardware 03" software="STU software v1.7"/>
14  </Device>
15  <Creator name="............"/>
16  <Title alphabet="My essence">
17    <lib:Alias xml:lang="ja">my essense</lib:Alias>
18  </Title>
19  <Description>An example text annotation about the target essense.<Description>
20 </NonRealTimeMeta>
```

FIG. 23

| | | xx | xx+1 | xx+2 | xx+3 | xx+4 | xx+5 | xx+6 | |
|---|---|---|---|---|---|---|---|---|---|
| | | A | B | C | D | A | B | C | D |
| | | A | B | C | D | A | B | C | D |

A-framePhase

00:00:00:00

| 00 | 00 | 01 | 02 | 03 | 04 | 05 | 06 | 07 | 08 | 09 |
|---|---|---|---|---|---|---|---|---|---|---|
|    | 00 | 01 | 02 | 03 | 04 | 00 | 01 | 02 | 03 | 04 |

| 01 | 01 | 02 | 03 | 04 | 05 | 06 | 07 | 08 | 09 |
|---|---|---|---|---|---|---|---|---|---|
|    | 00 | 01 | 02 | 03 | 04 | 00 | 01 | 02 | 03 |

| 02 | 02 | 03 | 04 | 05 | 06 | 07 | 08 | 09 |
|---|---|---|---|---|---|---|---|---|
|    | 00 | 01 | 02 | 03 | 04 | 00 | 01 | 02 |

| 03 | 03 | 04 | 05 | 06 | 07 | 08 |
|---|---|---|---|---|---|---|
|    | 00 | 01 | 02 | 03 | 04 | 00 | 01 |

| 04 | 04 | 05 | 06 | 07 | 08 | 09 |
|---|---|---|---|---|---|---|
|    | 00 | 01 | 02 | 03 | 04 | 00 |

| 00 | 05 | 06 | 07 | 08 | 09 | 10 |
|---|---|---|---|---|---|---|
|    | 00 | 01 | 02 | 03 | 04 | 00 |

| 01 | 06 | 07 | 08 | 09 | 10 | 11 |
|---|---|---|---|---|---|---|
|    | 00 | 01 | 02 | 03 | 04 | 00 |

....

00:00:59:28

| 03 | 28 | 29 | 00 | 01 | 02 | 03 |
|---|---|---|---|---|---|---|
|    | 00 | 01 | 02 | 03 | 04 | 00 |

| 04 | 29 | 00 | 01 | 02 | 03 | 04 |
|---|---|---|---|---|---|---|
|    | 00 | 01 | 02 | 03 | 04 | 00 |

00:01:00:00

| 00 | 00 | 01 | 02 | 03 | 04 | 06 |
|---|---|---|---|---|---|---|
|    | 00 | 01 | 02 | 03 | 04 | 00 |

| 01 | 01 | 02 | 03 | 04 | 05 | 06 |
|---|---|---|---|---|---|---|
|    | 00 | 01 | 02 | 03 | 04 | 00 |

| 02 | 02 | 03 | 04 | 06 | 06 | 07 |
|---|---|---|---|---|---|---|
|    | 00 | 01 | 02 | 03 | 04 | 00 |

FIG. 24

| | | xx | xx+1 | xx+2 | xx+3 | xx+4 | xx+5 | xx+6 | |
|---|---|---|---|---|---|---|---|---|---|
| 1 | | | | | | | | | |
| 2 | | | | | | | | | |
| 3 | | A | B | C | D | A | B | C | D |
| 4 | | A | B | C | D | A | B | C | D |
| 5 | | | | | | | | | |
| 6 | | 00:00:00:00 | | | | | | | |
| 7 | 00 | 00 | 01 | 02 | 03 | 04 | 05 | 06 | 07 | 08 | 09 |
| 8 | | 00 | 01 | 02 | 03 | 04 | 00 | 01 | 02 | 03 | 04 |
| 9 | | | | | | | | | |
| 10 | 01 | 01 | 02 | 03 | 04 | 05 | 06 | 07 | 08 | 09 |
| 11 | | 00 | 01 | 02 | 03 | 04 | 00 | 01 | 02 | 03 |
| 12 | | | | | | | | | |
| 13 | 02 | 02 | 03 | 04 | 05 | 06 | 07 | 08 | 09 |
| 14 | | 00 | 01 | 02 | 03 | 04 | 00 | 01 | 02 |
| 15 | | | | | | | | | |
| 16 | 03 | 03 | 04 | 05 | 06 | 07 | 08 | 09 |
| 17 | | 00 | 01 | 02 | 03 | 04 | 00 | 01 |
| 18 | | | | | | | | | |
| 19 | 04 | 04 | 05 | 06 | 07 | 08 | 09 |
| 20 | | 00 | 01 | 02 | 03 | 04 | 00 |
| 21 | | | | | | | | | |
| 22 | 00 | 05 | 06 | 07 | 08 | 09 | 10 |
| 23 | | 00 | 01 | 02 | 03 | 04 | 00 |
| 24 | | | | | | | | | |
| 25 | 01 | 06 | 07 | 08 | 09 | 10 | 11 |
| 26 | | 00 | 01 | 02 | 03 | 04 | 00 |
| 27 | .... | | | | | | | | |
| 28 | | 00:00:59:28 | | | | | | | |
| 29 | 03 | 28 | 29 | 02 | 03 | 04 | 05 |
| 30 | | 00 | 01 | 02 | 03 | 04 | 00 |
| 31 | | | | | | | | | |
| 32 | 04 | 29 | 02 | 03 | 04 | 05 | 06 |
| 33 | | 00 | 01 | 02 | 03 | 04 | 00 |
| 34 | | | | | | | | | |
| 35 | 00 | 02 | 03 | 04 | 05 | 06 | 07 |
| 36 | | 00 | 01 | 02 | 03 | 04 | 00 |
| 37 | | | | | | | | | |
| 38 | 01 | 03 | 04 | 05 | 06 | 07 | 08 |
| 39 | | 00 | 01 | 02 | 03 | 04 | 00 |
| 40 | | | | | | | | | |
| 41 | 02 | 04 | 05 | 06 | 07 | 08 | 09 |
| 42 | | 00 | 01 | 02 | 03 | 04 | 00 |

FIG. 25

| Line | Col | Timecode | | | | | |
|---|---|---|---|---|---|---|---|
| 1 | 01 | 00:01:59:28 | | | | | |
| | | 28 | 29 | 02 | 03 | 04 | 05 |
| 2 | | 00 | 01 | 02 | 03 | 04 | 00 |
| 3 | | | | | | | |
| 4 | 02 | 29 | 02 | 03 | 04 | 05 | 06 |
| 5 | | 00 | 01 | 02 | 03 | 04 | 00 |
| 6 | | 00:02:00:02 | | | | | |
| 7 | 03 | 02 | 03 | 04 | 05 | 06 | 07 |
| 8 | | 00 | 01 | 02 | 03 | 04 | 00 |
| 9 | | | | | | | |
| 10 | 04 | 03 | 04 | 05 | 06 | 07 | 08 |
| 11 | | 00 | 01 | 02 | 03 | 04 | 00 |
| 12 | | | | | | | |
| 13 | 00 | 04 | 05 | 06 | 07 | 08 | 09 |
| 14 | | 00 | 01 | 02 | 03 | 04 | 00 |
| 15 | | | | | | | |
| 16 | | 00:03:00:06 | | | | | |
| 17 | 00 | 06 | 07 | 08 | 09 | 10 | 11 |
| 18 | | 00 | 01 | 02 | 03 | 04 | 00 |
| 19 | | | | | | | |
| 20 | | 00:04:00:08 | | | | | |
| 21 | 00 | 08 | 09 | 10 | 11 | 12 | 13 |
| 22 | | 00 | 01 | 02 | 03 | 04 | 00 |
| 23 | | | | | | | |
| 24 | | 00:05:00:10 | | | | | |
| 25 | 00 | 10 | 11 | 12 | 13 | 14 | 15 |
| 26 | | 00 | 01 | 02 | 03 | 04 | 00 |
| 27 | | | | | | | |
| 28 | | 00:06:00:12 | | | | | |
| 29 | 00 | 12 | 13 | 14 | 15 | 16 | 17 |
| 30 | | 00 | 01 | 02 | 03 | 04 | 00 |
| 31 | | | | | | | |
| 32 | | 00:07:00:14 | | | | | |
| 33 | 00 | 14 | 15 | 16 | 17 | 18 | 19 |
| 34 | | 00 | 01 | 02 | 03 | 04 | 00 |
| 35 | | | | | | | |
| 36 | | 00:08:00:16 | | | | | |
| 37 | 00 | 16 | 17 | 18 | 19 | 20 | 21 |
| 38 | | 00 | 01 | 02 | 03 | 04 | 00 |
| 39 | | | | | | | |
| 40 | | 00:09:00:18 | | | | | |
| 41 | 00 | 18 | 19 | 20 | 21 | 22 | 23 |
| 42 | | 00 | 01 | 02 | 03 | 04 | 00 |
| 43 | | | | | | | |
| 44 | | 00:10:00:18 | | | | | |
| 45 | 00 | 18 | 19 | 20 | 21 | 22 | 23 |
| 46 | | 00 | 01 | 02 | 03 | 04 | 00 |

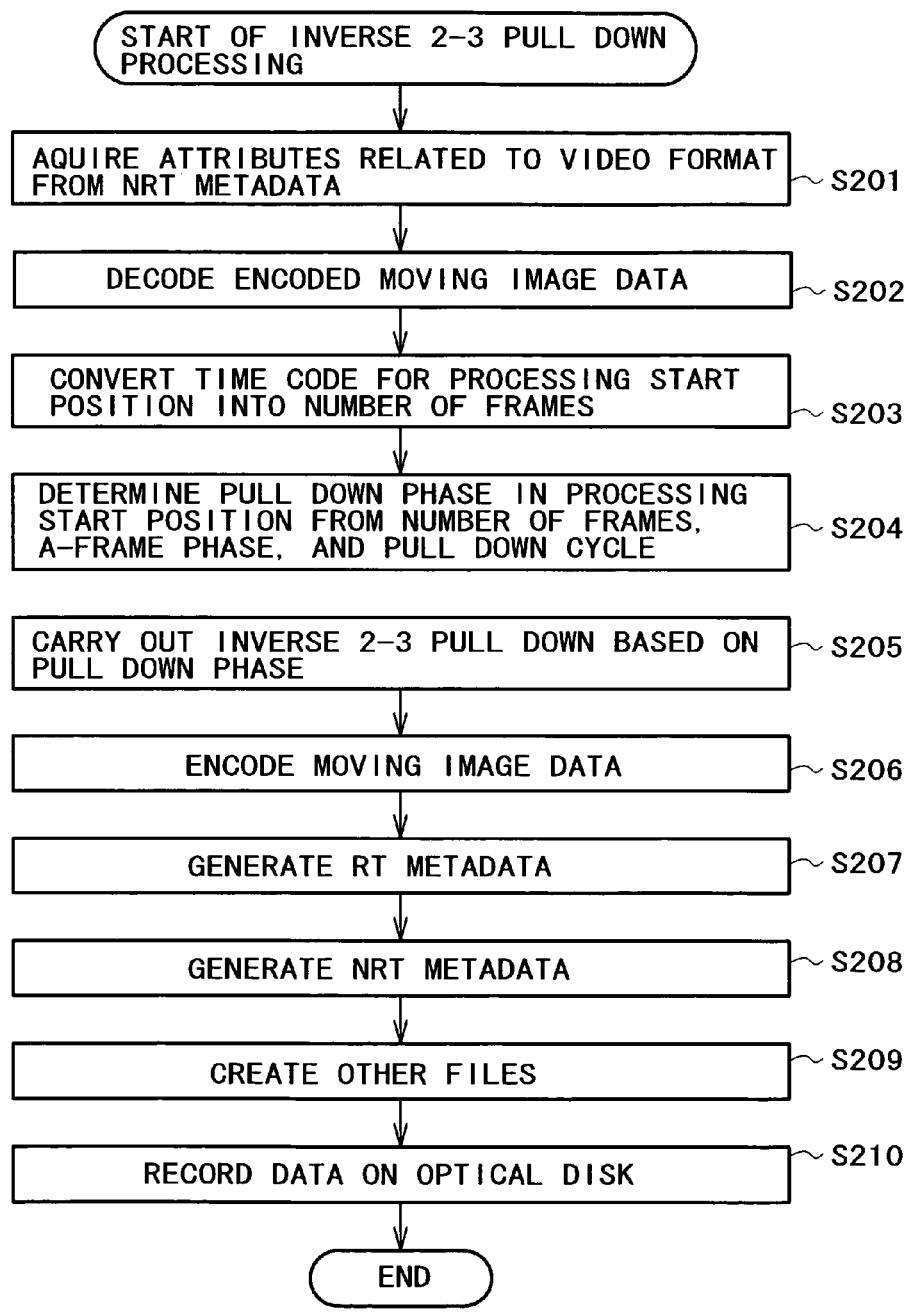

EQUIPMENT AND METHOD FOR INFORMATION PROCESSING, RECORDING MEDIUM, AND PROGRAM

BACKGROUND OF THE INVENTION

1. Field of the Invention

The present invention relates to equipment and a method for information processing, a recording medium, and a program. More particularly, it relates to equipment and a method for information processing, a recording medium, and a program wherein original video signals can be easily and accurately reproduced from video signals pulled down.

2. Description of Related Art

In general, pictures on a movie film or the like are shot and recorded at a frame rate of 24 fps (frames per second). A technology called 2-3 pull down for converting this into 30 fps (i.e. 60 fields/sec), which is the frame rate in accordance with the NTSC (National Television System Committee) system, is known.

2-3 pull down processing is a technology for converting frames shot at 24 fps into 30 fps, by alternately converting frames into 2 field and 3 field. More specific description will be given. Two frames shot at 24 fps are converted into 5 (2+3) fields, and thus 24 frames are converted into 60 fields (=(24÷2)×5). A field added during 2-3 pull down processing is designated as repeat field.

2-3 pull down processing makes it possible to screen movies or the like produced at 24 fps on NTSC television.

Processing called "inverse 2-3 pull down" is also known. This is a technology for returning moving image data, converted into 30 fps by 2-3 pull down processing, to its original frame rate, 24 fps. This processing is utilized for editing video pictures, for example, for television broadcast. (Refer to Patent Document 1, for example.)

Inverse 2-3 pull down processing is also used for encoding pictures utilizing the correspondence between frames in MPEG (Moving Picture Experts Group) 2 or the like. More specific description will be given. In MPEG, there are three picture types: I (Intra) picture, P (Predictive) picture, and B (Bidirectionally predictive) picture. I pictures are intra encoded without referring to other pictures. P pictures are intra encoded or predictive encoded. This predictive encoding is carried out by referring to the picture or P picture displayed precedently in time and using a predictive image generated from the picture referred to. B pictures are intra encoded or predictive encoded. This predictive encoding is carried out as follows: either or both of the I picture or P picture displayed precedently in time and the I picture or P picture displayed subsequently in time are referred to and a predictive image generated from the picture(s) referred to is used. Therefore, if moving image data obtained by 2-3 pull down processing is directly encoded in MPEG2, the picture quality can be degraded due to the influence of repeat fields.

Therefore, if inverse 2-3 pull down processing is performed prior to encoding in MPEG2 or the like, repeat fields which can cause degradation in picture quality can be eliminated. As a result, degradation in picture quality can be prevented.

[Patent Document 1]

Japanese Unexamined Patent Publication No. 2002-125192

To perform inverse 2-3 pull down processing, it is required to identify which fields are repeat fields with accuracy. Patent Document 1 discloses a technology for identifying repeat field. This technology is such that: the sequence number of each field is added to VITC (Vertical Interval Time Code) in advance during 2-3 pull down processing. Thus, fields provided with specific sequence numbers are repeat fields. Therefore, the repeat fields can be identified with accuracy by referring to the sequence number.

However, in the method disclosed in Patent Document 1, all the fields must be provided with individual sequence numbers, and this requires some time and effort.

SUMMARY OF THE INVENTION

The present invention has been made with this situation taken into account, and its object is to make it possible to more easily identify repeat fields.

First information processing equipment according to the present invention comprises a first generating means and a second generating means. The first generating means generates a second video signal at a second frame rate different from a first frame rate from a first video signal recorded at the first frame rate. The second generating means generates attribute information. This attribute information is recorded on a recording medium together with the second video signal. At the same time, the attribute information includes phase information which indicates the phase within a cycle of the top frame in the second video signal generated by the first generating means.

The second generating means may be so constituted that it generates the attribute information further including pull down kind information. The pull down kind information indicates the kind of the above pull down carried out when the second video signal is generated from the first video signal by the first generating means.

A first information processing method according to the present invention comprises a first generation step and a second generation step. In the first generation step, a second video signal at a second frame rate different from a first frame rate is generated from a first video signal recorded at the first frame rate. In the second generation step, attribute information is generated. This attribute information is recorded on a recording medium together with the second video signal. At the same time, the attribute information includes phase information which indicates the phase within a cycle of the top frame in the second video signal generated through the processing in the first generation step.

The program for a first recording medium according to the present invention comprises a first generation step and a second generation step. In the first generation step, a second video signal at a second frame rate different from a first frame rate is generated from a first video signal recorded at the first frame rate. In the second generation step, attribute information is generated. This attribute information is recorded on a recording medium together with the second video signal. At the same time, the attribute information includes phase information which indicates the phase within a cycle of the top frame in the second video signal generated through the processing in the first generation step.

A first program according to the present invention causes a computer which pulls down video signals with a predetermined number of frames taken as a cycle to carry out a first generation step and a second generation step. In the first generation step, a second video signal at a second frame rate different from a first frame rate is generated from a first video signal recorded at the first frame rate. In the second generation step, attribute information is generated. This attribute information is recorded on a recording medium together with the second video signal. At the same time, the attribute information includes phase information which indicates the phase within a cycle of the top frame in the second video signal generated through the processing in the first generation step.

Second information processing equipment according to the present invention comprising an identifying means and a generating means. The identifying means identifies the phase within a cycle of a frame contained in a first video signal based on the following: phase information which indicates the phase within a cycle of the top frame in the first video signal and time code added to the first video signal. The generating means generates a second video signal based on the phase within a cycle of the frame contained in the first video signal, identified by the identifying means based on the result of the judgment.

The identifying means may be so constituted that it judges whether the first video signal have any drop frame and identifies the phase within the cycle of a frame contained in the first video signal.

A second information processing method according to the present invention comprises an identification step and a generation step. In the identification step, the phase within a cycle of a frame contained in a first video signal is identified based on the following: phase information which indicates the phase within the cycle of the top frame in the first video signal and time code added to the first video signal. In the generation step, a second video signal is generated based on the phase within a cycle of the frame contained in the first video signal, identified through the processing in the identification step.

The program for a second recording-medium according to the present invention comprises an identification step and a generation step. In the identification step, the phase within a cycle of a frame contained in a first video signal is identified based on the following: phase information which indicates the phase within a cycle of the top frame in the first video signal and time code added to the first video signal. In the generation step, a second video signal is generated based on the phase within a cycle of the frame contained in the first video signal, identified through the processing in the identification step.

A second program according to the present invention causes a computer which generates a second video signal not pulled down from a first video signal pulled down with a predetermined number of frames taken as a cycle to carry out an identification step and a generation step. In the identification step, the phase within the cycle of a frame contained in the first video signal based on the following: phase information which indicates the phase within the cycle of the top frame in the first video signal, and time code added to the first video signal. In the generation step, a second video signal is generated based on the phase within the cycle of the frame contained in the first video signal, identified through the processing in the identification step.

With the first equipment and method for information processing, recording medium, and program according to the present invention, a second video signal and attribute information are generated. The second video signal at a second frame rate different from a first frame rate is generated from a first video signal recorded at the first frame rate. The attribute information is recorded on a recording medium together with the second video signal. At the same time, the attribute information includes phase information which indicates the phase within a cycle of the top frame in the second video signal generated.

With the second equipment and method for information processing, recording medium, and program according to the present invention, the following is carried out: the phase within a cycle of a frame contained in a first video signal is identified based on the following: phase information which indicates the phase within the cycle of the top frame in the first video signal and time code added to the first video signal. A second video signal is generated based on the identified phase within a cycle of the frame contained in the first video signal.

The information processing equipment according to the present invention may be a standalone device or a block which performs information processing.

BRIEF DESCRIPTION OF THE DRAWINGS

FIG. 12 is a schematic diagram illustrating an example of the constitution of data recorded on the optical disk in FIG. 1.

FIGS. 13A and 13B are schematic diagrams explaining examples of the constitution of data recorded on the optical disk in FIG. 1.

FIG. 18 is a drawing illustrating an example of the description of non-real time metadata.

FIG. 19 is a drawing illustrating an example of the description of non-real time metadata, following FIG. 18.

FIG. 20 is a drawing illustrating an example of the description of non-real time metadata, following FIG. 19.

FIG. 21 is a drawing illustrating an example of the description of non-real time metadata, following FIG. 20.

FIG. 22 is a drawing illustrating an example of the description of non-real time metadata, following FIG. 21.

FIG. 23 is a drawing explaining the correspondence between time code and pull down phase with respect to non-drop frame.

FIG. 24 is a drawing explaining the correspondence between time code and pull down phase with respect to drop frame.

FIG. 25 is another drawing explaining the correspondence between time code and pull down phase with respect to drop frame.

FIG. 26 is a flowchart explaining inverse 2-3 pull down processing.

DETAILED DESCRIPTION OF THE PREFERRED EMBODIMENTS

Figure 1:
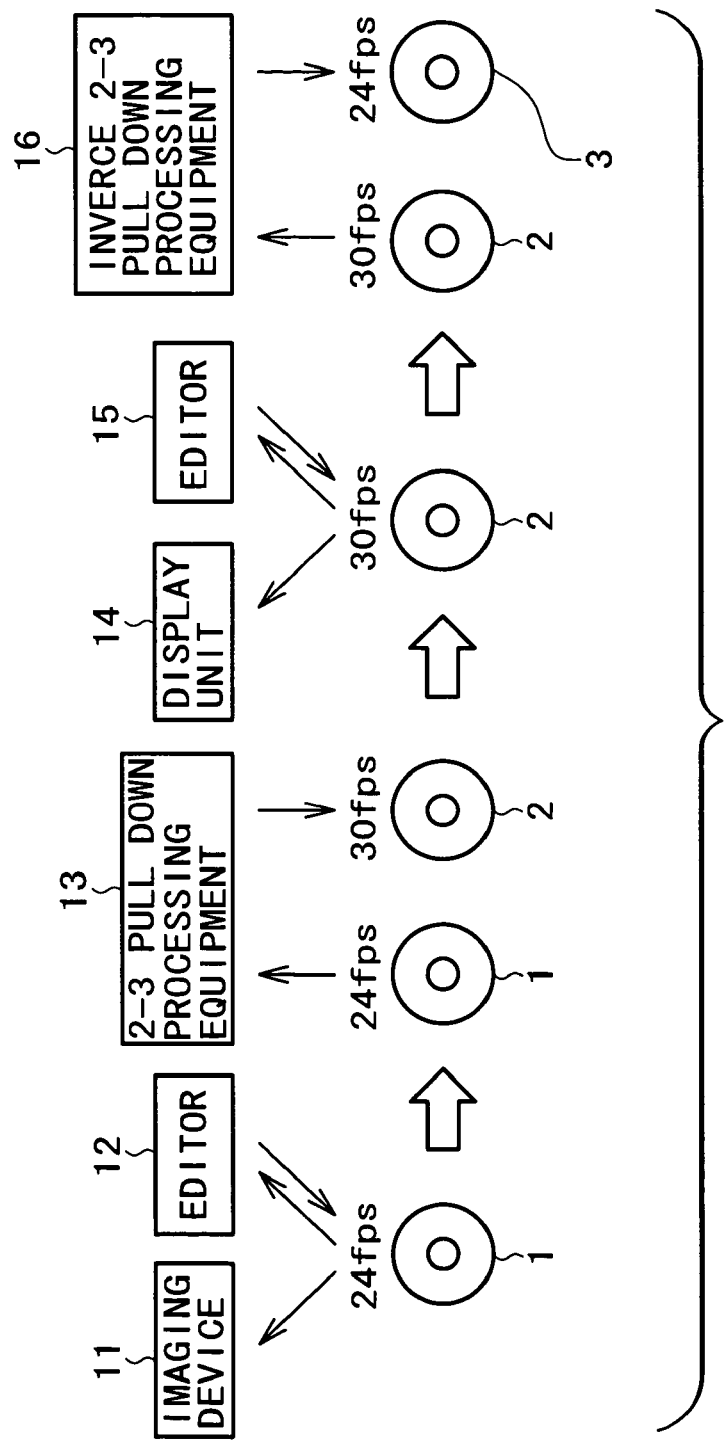
FIG. 1 is a drawing illustrating an example of the configuration of a video picture program production support system to which the present invention is applied.

The embodiments of the present invention will be described below. The correspondence between the composing elements described in the claims and the concrete examples in the embodiments is described as follows: this description is indented to confirm that the concrete examples which support the invention described in the claims are covered in the embodiments. Therefore, there can be a concrete example which is described in the embodiments but is not described here as corresponding to any composing element. Even if so, that does not mean that the concrete example does not correspond to the composing element. Conversely, some concrete example can be described here as corresponding to any composing element. Even if so, that does not mean that the concrete example does not correspond to the other composing elements than that composing element.

Further, this description does not mean that the invention corresponding to some concrete example described in the embodiments is all described in the claims. In other words, this description is on the invention corresponding to the concrete examples described in the embodiments. This description does not deny the existence of any invention that is not covered in the claims in this application. That is, this description does not deny the existence of any invention for which a divisional application will be made in the future or any invention that will be added by amendment.

The information processing equipment (e.g. 2-3 pull down processing equipment 13 in FIG. 1) according to Claim 1 comprises a first generating means and a second generating means. The first generating means (e.g. frame conversion unit 62 in FIG. 3) generates a second video signal (e.g. 60i moving image data in FIG. 4) from a first video signal (e.g. 24p moving image data in FIG. 4). The second video signal is at a second frame rate (e.g. 30 fps) different from a first frame rate (e.g. 24 fps), and the first video signal is recorded at the first frame rate. The second generating means (e.g. NRT metadata processing unit 67 in FIG. 3) generates attribute information (e.g. non-real time metadata file 262 in FIG. 15). This attribute information is recorded on a recording medium (e.g. optical disk 2 in FIG. 1) together with the second video signal. At the same time, the attribute information includes phase information (e.g. description [aFramePhase="00"] on the first line in FIG. 22). The phase information indicates the phase within a cycle of the top frame (e.g. Frame F0' in FIG. 4) in the second video signal generated by the first generating means.

In the information processing equipment according to claim 2, the second generating means is caused to generate the attribute information further including pull down kind information. This pull down kind information (e.g. description [pullDownKind="2-3"] on the first line in FIG. 22) indicates the kind of the pull down used when the second video signal is generated from the first video signal by the first generating means.

The information processing method according to claim 3 comprises a first generation step and a second generation step. In the first generation step (e.g. Step 103 in FIG. 17), a second video signal (e.g. 60i moving image data in FIG. 4) is generated from a first video signal (e.g. 24p moving image data in FIG. 4). The second video signal is at a second frame rate (e.g. 30 fps) different from a first frame rate (e.g. 24 fps), and the first video signal is recorded at the first frame rate. In the second generation step (e.g. Step 104 in FIG. 17), attribute information (e.g. non-real time metadata file 262 in FIG. 15) is generated. This attribute information is recorded on a recording medium (e.g. optical disk 2 in FIG. 1) together with the second video signal. At the same time, the attribute information includes phase information (e.g. description [aFramePhase="00"] on the first line in FIG. 22). The phase information indicates the phase within a cycle of the top frame (e.g. Frame F0' in FIG. 4) in the second video signal generated through the processing in the first generation step.

The information processing equipment (e.g. inverse 2-3 pull down processing equipment 16 in FIG. 1) according to claim 6 comprises an identifying means and a generating means. The identifying means (e.g. phase identification unit 124 in FIG. 11) identifies the phase within a cycle of a frame contained in a first video signal (e.g. 60i moving image data in FIG. 4) based on the following: phase information (e.g. description [aFramePhase="00"] on the first line in FIG. 22) which indicates the phase within a cycle of the top frame (e.g. Frame F0' in FIG. 4) in the first video signal and time code (e.g. 60i time code in FIG. 4) added to the first video signal. The generating means (e.g. frame conversion unit 122 in FIG. 11) generates a second video signal (e.g. 24p moving image data in FIG. 4) based on the phase within a cycle of the frame contained in the first video signal, identified by the identifying means.

The information processing method according to Claim 8 comprises an identification step and a generation step. In the identification step (e.g. Step 204 in FIG. 26), the phase within a cycle of a frame contained in a first video signal (e.g. 60i moving image data in FIG. 4) is identified based on the following: phase information (e.g. description [aFramePhase="00"] on the first line in FIG. 22) which indicates the phase within a cycle of the top frame (e.g. Frame F0' in FIG. 4) in the first video signal and time code (e.g. 60i time code in FIG. 4) added to the first video signal. In the generation step (e.g. Step 205 in FIG. 26), a second video signal (e.g. 24p moving image data in FIG. 4) is generated based on the following: the phase within a cycle of the frame contained in the first video signal, identified through the processing in the identification step.

With respect to recording medium and program, the correspondence between the embodiments and the claims is the same as with the methodological claims, and its description will be omitted.

Referring to the drawings, the embodiments of the present invention will be described below.

FIG. 1 is a drawing illustrating an example of the configuration of a video picture program production support system to which the present invention is applied.

The video picture program production support system in FIG. 1 is a system installed, for example, in television stations which broadcast television signals, production companies for video picture contents, such as video products and movies, or the like. The system is for producing video picture programs which are video picture products, such as television programs and movies. The video picture program production support system allows a plurality of units taking partial charge of video picture program production to consistently utilize metadata and the like, added to video picture programs and constituted in the form of electronic file. Thus, the system is for efficiently producing video picture programs.

As illustrated in FIG. 1, the video picture program production support system comprises an imaging device 11, editor 12, 2-3 pull down processing equipment 13, display unit 14, editor 15, inverse 2-3 pull down processing equipment 16, optical disk 1, optical disk 2, and optical disk 3.

The imaging device 11 picks up the image of a subject. At the same time, the imaging device 11 generates moving image data at a frame rate of 24 fps (frames per second) and in progressive scan (non-interlace) format, and records the data on the optical disk 1. In the following description, the moving image data at a frame rate of 24 fps and in progressive scan format will be also referred to as "24p moving image data."

The editor 12 edits the moving image data, recorded on the optical disk 1, in a non-destructive manner, and records the result of editing on the optical disk 1. The editor 12 is a device capable of editing 24p moving image data.

The optical disk 1 on which the moving image data shot by the imaging device 11 and edited by the editor 12 is loaded in the 2-3 pull down processing equipment 13.

The 2-3 pull down processing equipment 13 carries out 2-3 pull down processing on the moving image data at 24 fps recorded on the optical disk 1. Thereby, the equipment 13 generates moving image data at a frame rate of 30 fps and in interlace format, and records the data on the optical disk 2. In case of interlace format, one frame is constituted of two fields: top field and bottom field. Therefore, in case of non-drop frame, moving image data at 30 fps is constituted at 60 fields/second. In the following description, the moving image data at a frame rate of 30 fps and in interlace format will be also referred to as "60i moving image data." In case of drop frame, however, the prefixed numeral is actually 59.94i, and this case will be described when required.

The display unit 14 displays the 60i (59.94i for drop frame) moving image data recorded on the optical disk 2. The display unit 14 is incapable of displaying the 24p moving image data, and it is a display unit capable of displaying the 60i (59.94i for drop frame) moving image data. Therefore, the display unit 14 cannot display the 24p moving image data recorded on the optical disk 1.

The editor 15 edits the 60i (59.94i for drop frame) moving image data recorded on the optical disk 2 in a non-destructive manner, and records the result of editing on the optical disk 2. The editor 15 is incapable of editing the 24p moving image data, and it is a device capable of editing the 60i (59.94i for drop frame) moving image data.

The optical disk 2 on which the moving image data edited by the editor 15 is recorded is loaded in the inverse 2-3 pull down processing equipment 16.

The inverse 2-3 pull down processing equipment 16 carries out inverse 2-3 pull down processing on the 60i (59.94i for drop frame) moving image data recorded on the optical disk 2. Thereby, the equipment 16 generates 24p moving image data, and records the data on the optical disk 3.

Figure 2:
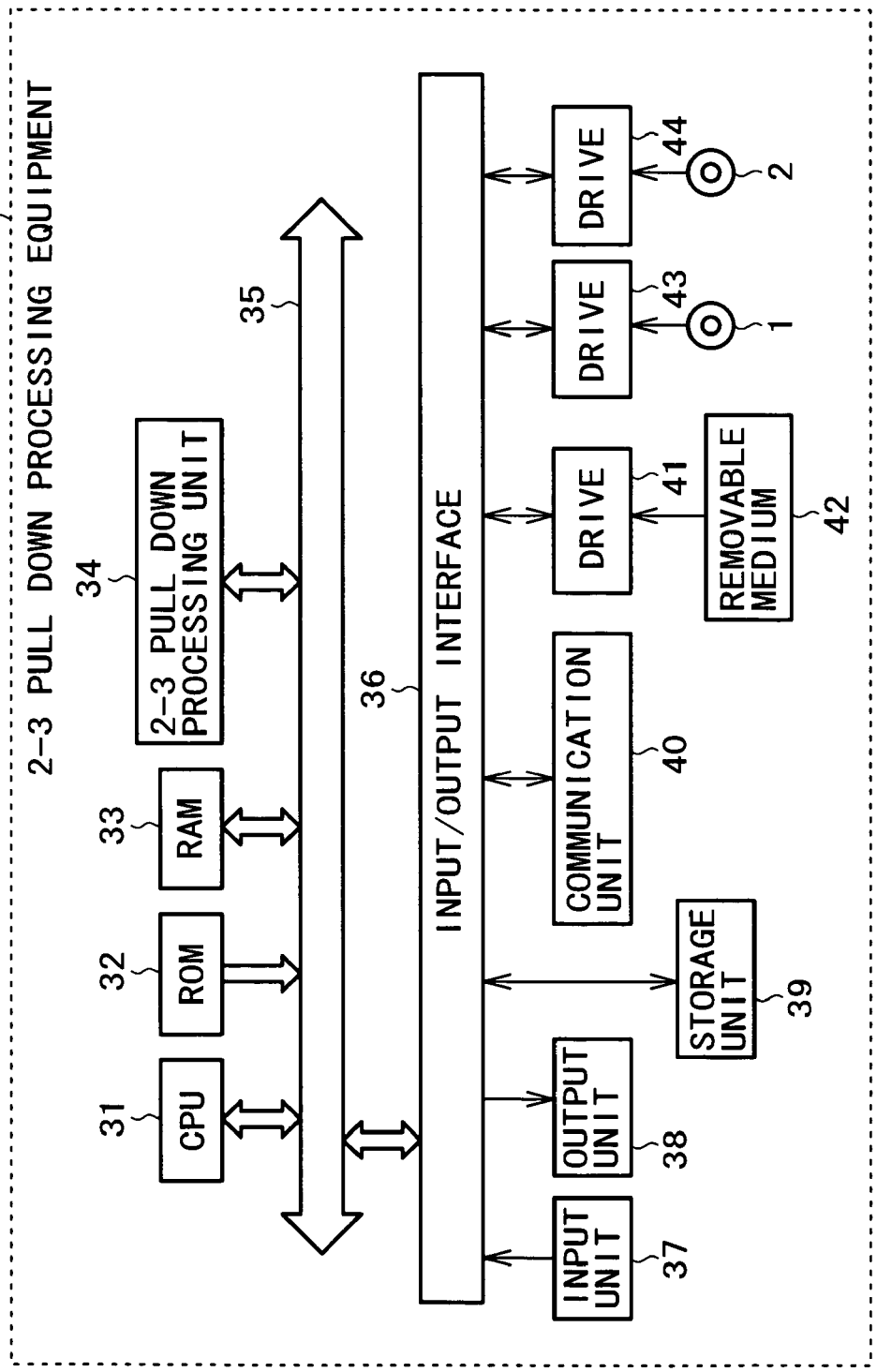
FIG. 2 is a block diagram illustrating an example of the internal configuration of the 2-3 pull down processing equipment in FIG. 1.

FIG. 2 is a block diagram illustrating an example of the internal configuration of the 2-3 pull down processing equipment 13.

The CPU (Central Processing Unit) 31 of the 2-3 pull down processing equipment 13 in FIG. 2 performs varied processing according to programs stored in ROM (Read Only Memory) 32. In RAM (Random Access Memory) 33, data and programs required for the CPU 31 to perform the varied processing are stored as appropriate.

A 2-3 pull down processing unit 34 carries out 2-3 pull down processing on the 24p moving image data read out of the optical disk 1 loaded in a drive 43, and generates 60i (59.94i for drop frame) moving image data. The generated 60i (59.94i for drop frame) moving image data is recorded on the optical disk 2 by the drive 44.

The CPU 31, ROM 32, RAM 33, and 2-3 pull down processing unit 34 are connected with one another through a bus 35. The bus 35 is also connected with an input/output interface 36.

The input/output interface 36 is connected with an input unit 37 comprising a keyboard and a mouse, and outputs a signal, inputted at the input unit 37, to the CPU 31. The input/output interface 36 is also connected with an output unit 38 comprising a display, speaker, and the like.

Further, the input/output interface 36 is connected with the following: a storage unit 39 comprising a hard disk, EEPROM (Electronically Erasable and Programmable Read Only Memory),and the like; and a communication unit 40 which communicates data to and from other devices through a network, such as the Internet and LAN (Local Area Network). A drive 41 is used to write or read data to or from a removable medium 42, including a magnetic disk, optical disk, magneto-optic disk, or recording medium, such as semiconductor memory.

Further, the input/output interface 36 is connected with a drive 43 and a drive 44. The drive 43 reads 24p moving image data or the like out of the optical disk 1 loaded therein. The drive 44 records the 60i (59.94i for drop frame) moving image data, generated by the 2-3 pull down processing unit 34, on the optical disk 2.

Figure 3:
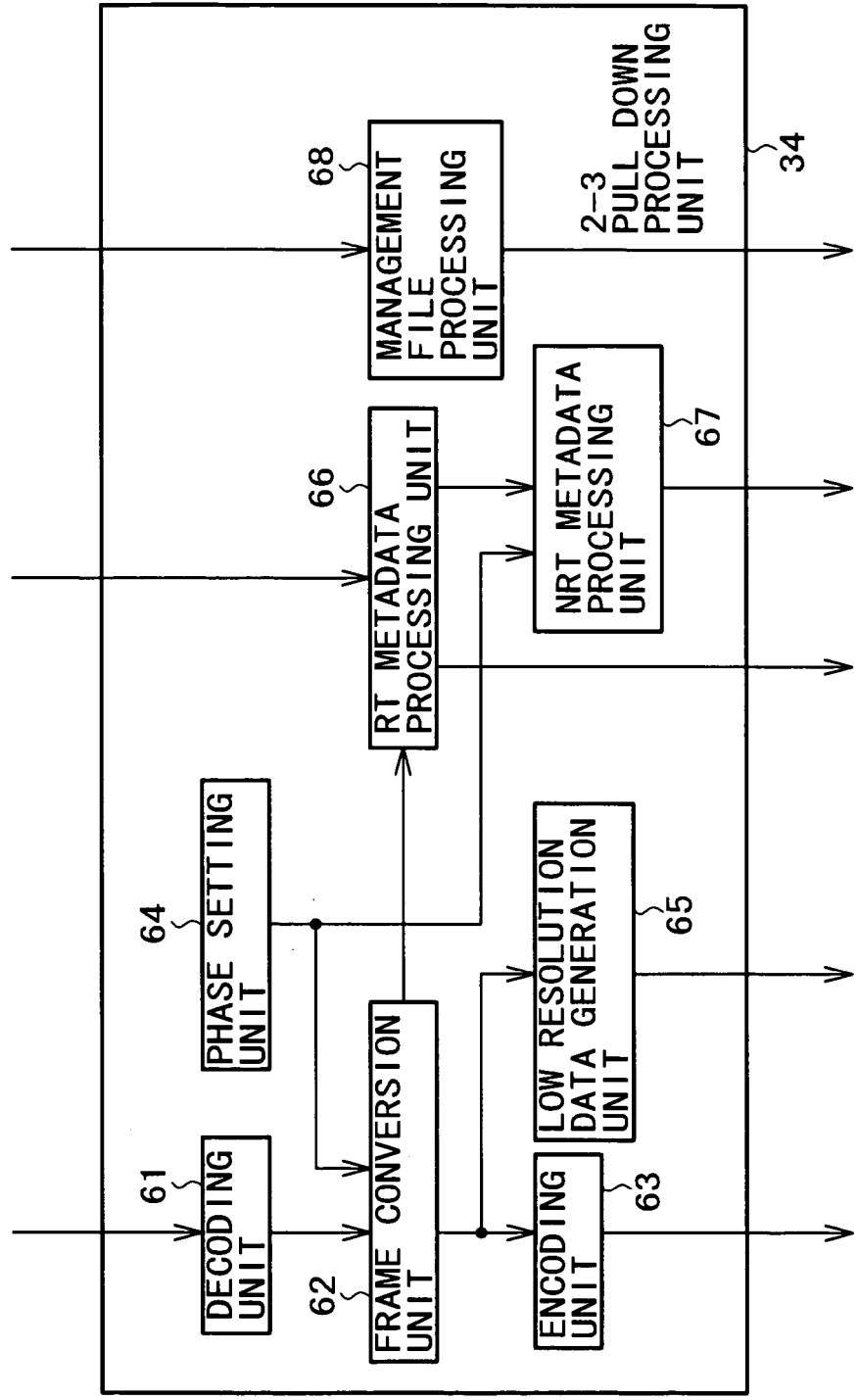
FIG. 3 is a block diagram illustrating an example of the internal configuration of the 2-3 pull down processing unit in FIG. 2.

FIG. 3 illustrates an example of the internal configuration of the 2-3 pull down processing unit 34.

As illustrated in FIG. 3, the 2-3 pull down processing unit 34 comprises a decoding unit 61, frame conversion unit 62, encoding unit 63, phase setting unit 64, low resolution data generation unit 65, RT metadata processing unit 66, NRT metadata processing unit 67, and management file processing unit 68.

The decoding unit 61 decodes moving image data encoded by such an encoding method as MPEG (Moving Picture Experts Group) 2, and supplies the decoded image data to the frame conversion unit 62. More specific description will be given. The 24p moving image data recorded on the optical disk 1 is encoded by such an encoding method as MPEG2. Therefore, when supplied with this moving image data, the decoding unit 61 performs decoding processing corresponding to the encoding method. Then, the decoding unit 61 outputs the frame data of the decoded moving image to the frame conversion unit 62.

The frame conversion unit 62 carries out 2-3 pull down processing on the 24p moving image data supplied from the decoding unit 61, and generates 60i (59.94i for drop frame) moving image data. Then, the unit 62 outputs the generated 60i (59.94i for drop frame) moving image data to the encoding unit 63 and the low resolution data generation unit 65. When carrying out 2-3 pull down processing, the frame conversion unit 62 takes a predetermined frame as A-frame based on notification from the phase setting unit 64. (The details of A-frame will be described later.)

The encoding unit 63 encodes the moving image data, supplied from the frame conversion unit 62, by such an encoding method as MPEG2, and outputs the encoded data.

The low resolution data generation unit 65 generates low resolution moving image data from the moving image data supplied from the frame conversion unit 62. The original moving image data is large in the amount of data, but it is moving image data of high picture quality; therefore, it is used in the finished products of video picture programs. Low resolution data is generated by reducing the number of pixels of each frame in the original moving image data or by the like procedure. Thus, low resolution data is moving image data corresponding to the images with frames small in the number of pixels. Low resolution data may be further encoded in MPEG4 or the like. The low resolution data is lower in picture quality than the original moving image data. Since it is small in the amount of data, however, it imposes lighter load in the processing of transmission, playback, and the like, and is used mainly in rough editing and the like.

The phase setting unit 64 sets an A-frame phase and notifies the frame conversion unit 62 and the NRT metadata processing unit 67 of the A-frame phase. Here, description will be given to A-frame and A-frame phase.

Figure 4:
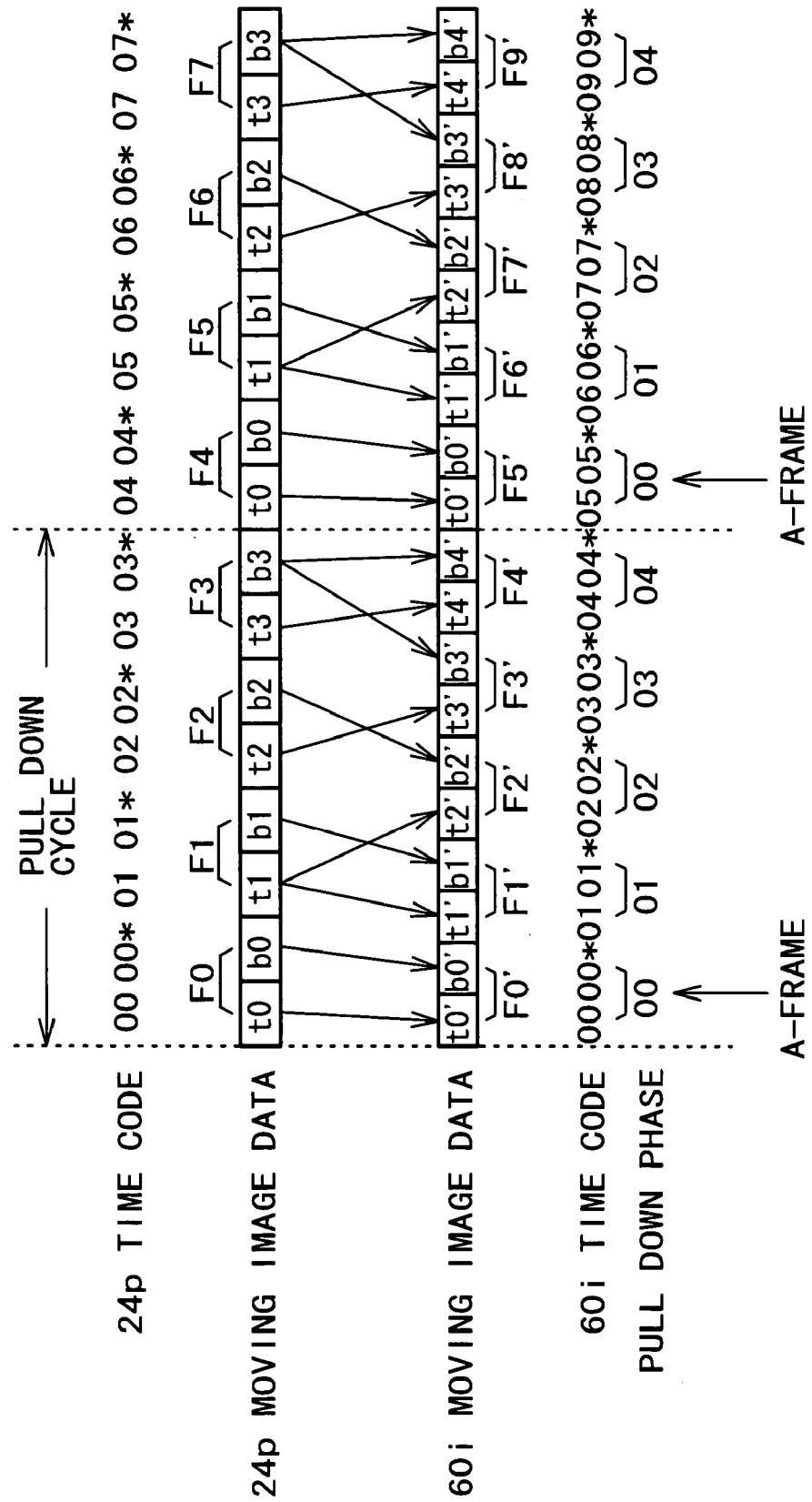
FIG. 4 is a drawing explaining 2-3 pull down.

As illustrated in FIG. 4, in 2-3 pull down processing, a process in which five frames of 60i (or 59.94i) are generated from four frames in 24p moving image data is repeated over a series of frames. FIG. 4 is a drawing illustrating the relation between 24p moving image data and 60i moving image data generated through 2-3 pull down processing.

In FIG. 4, "t" represents top field, and "b" represents bottom field. The two-digit numeral "00" indicated as the time code for the 24p or 60i moving image data indicates only the frame unit portion of the time code. More specific description will be given. The time code comprises hour unit, minute unit, second unit, and frame unit, and in reality, it indicates "hour: minute:second:frame" in this order. However, FIG. 4 indicates only the frame unit portion because of the limited space. For example, therefore, the time code "00" in FIG. 4 is "00: 00:00:00" for "hour:minute:second:frame" in reality. Hereafter, the time code for the 24p moving image data will be referred to as "24p time code," and the time code for the 60i moving image data will be referred to as "60i time code." Further, the time code for the 59.94i moving image data will be referred to as "59.94i time code."

The mark of "*" suffixed to the time code in FIG. 4 indicates that that field whose time code is marked with "*" is a bottom field. Codes "F0" to "F7" denote individual frames in the 24p moving image data, respectively. Codes "F0'" to "F9'" denote individual frames in the 60i moving image data, respectively.

As illustrated in FIG. 4, the top field t0 of Frame F0 in the 24p moving image data is taken as the top field t0' of Frame F0 in the 60i moving image data. The bottom field b0 of Frame F0 in the 24p moving image data is taken as the bottom field b0' of Frame F0' in the 60i moving image data.

The top field t1 of Frame F1 in the 24p moving image data is taken as the top field t1' of Frame F1' and the top field t2' of Frame F2' in the 60i moving image data. This top field t2' is a so-called repeat field. The bottom field b1 of Frame F1 in the 24p moving image data is taken as the bottom field b1' of Frame F1' in the 60i moving image data.

The top field t2 of Frame F2 in the 24p moving image data is taken as the top field t3' of Frame F3' in-the 60i moving image data. The bottom field b2 of Frame F2 in the 24p moving image data is taken as the bottom field b2' of Frame F2' in the 60i moving image data.

The top field t3 of Frame F3 in the 24p moving image data is taken as the top field t4' of Frame F4' in the 60i moving image data. The bottom field b3 of Frame F3 in the 24p moving image data is taken as the bottom field b3' of Frame F3' and the bottom field b4' of Frame F4' in the 60i moving image data. This bottom field b4' is a repeat field.

At the time code "00:00:00:04" and the following time codes for the 24p moving image data, the process in which five frames are generated from four frames is periodically repeated. The cycle which is repeated with the five frames obtained by pull down processing, illustrated in FIG. 4, taken as one set is referred to as "pull down cycle."

The position of each frame within the pull down cycle illustrated in FIG. 4 can be represented as pull down phase.

More specific description will be given. With respect to the moving image data obtained by 2-3 pull down processing, the pull down phase of Frame F0' can be set to "00"; the pull down phase of Frame F1' can be set to "01"; the pull down phase of Frame F2' can be set to "02"; the pull down phase of Frame F3' can be set to "03"; and the pull down phase of the Frame F4' can be set to "04."

With respect to the subsequent frames, the position of each frame within the pull down cycle can be similarly represented as pull down phase for each pull down cycle. An example will be taken. With respect to the moving image data obtained by 2-3 pull down processing, the pull down phase of Frame F5' can be set to "00"; the pull down phase of Frame F6' can be set to "01"; the pull down phase of Frame F7' can be set to "02"; the pull down phase of Frame F8' can be set to "03"; and the pull down phase of Frame F9' can be set to "04."

The top frame within the pull down cycle of the moving image data obtained by 2-3 pull down processing is also referred to as "A-frame." In FIG. 4, Frame F0' and Frame F5' are A-frame.

In FIG. 4, a case where 2-3 pull down processing is carried out with Frame F0 at "00:00:00:00" taken as the top frame within the pull down cycle is taken as an example for the sake of simplicity. This is an example. In reality, when 2-3 pull down processing is carried out, a frame whose time code is other than "00:00:00:00" may be taken as the top frame within the pull down cycle.

Figure 5:
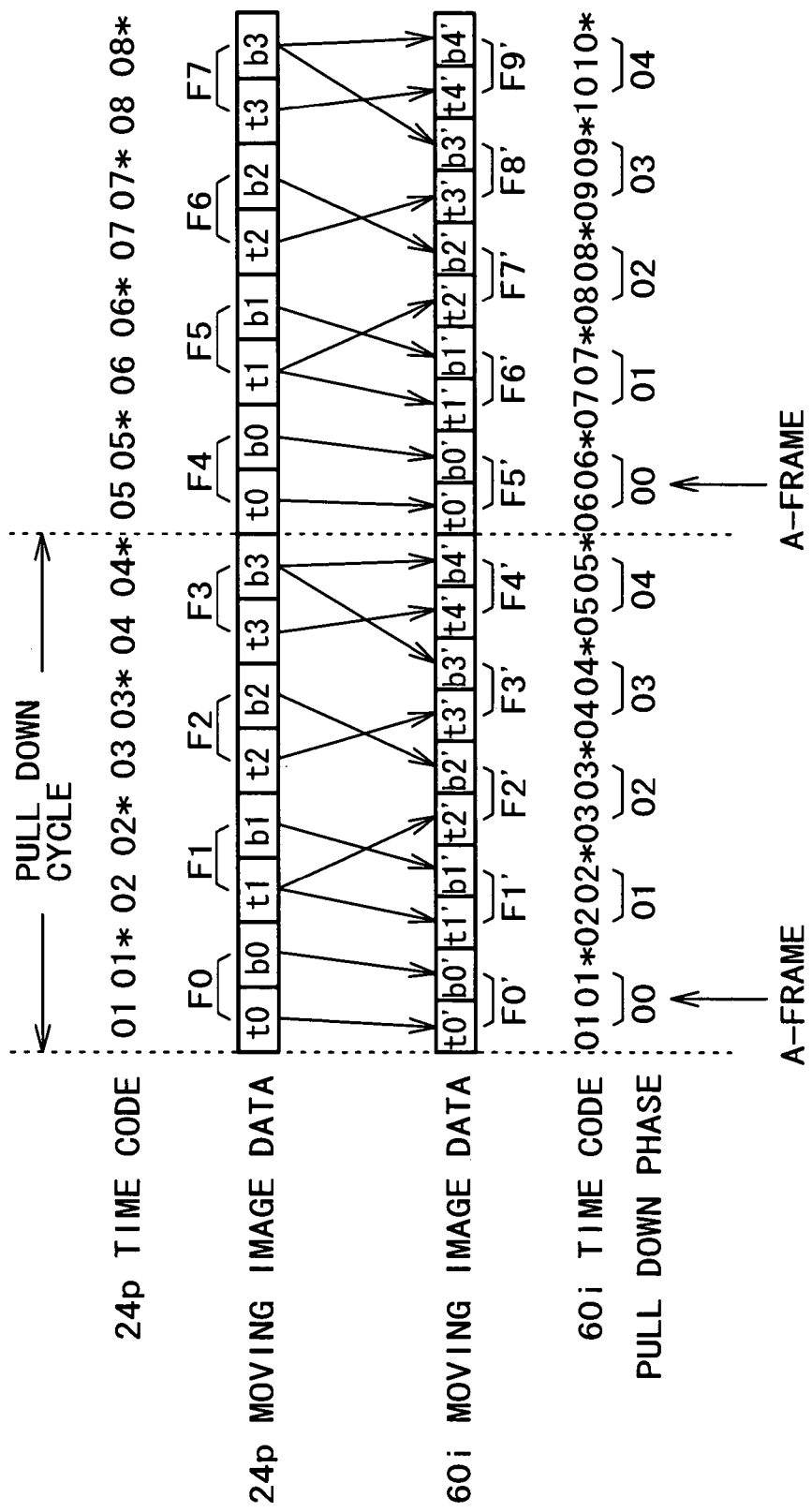
FIG. 5 is another drawing explaining 2-3 pull down.
Figure 6:
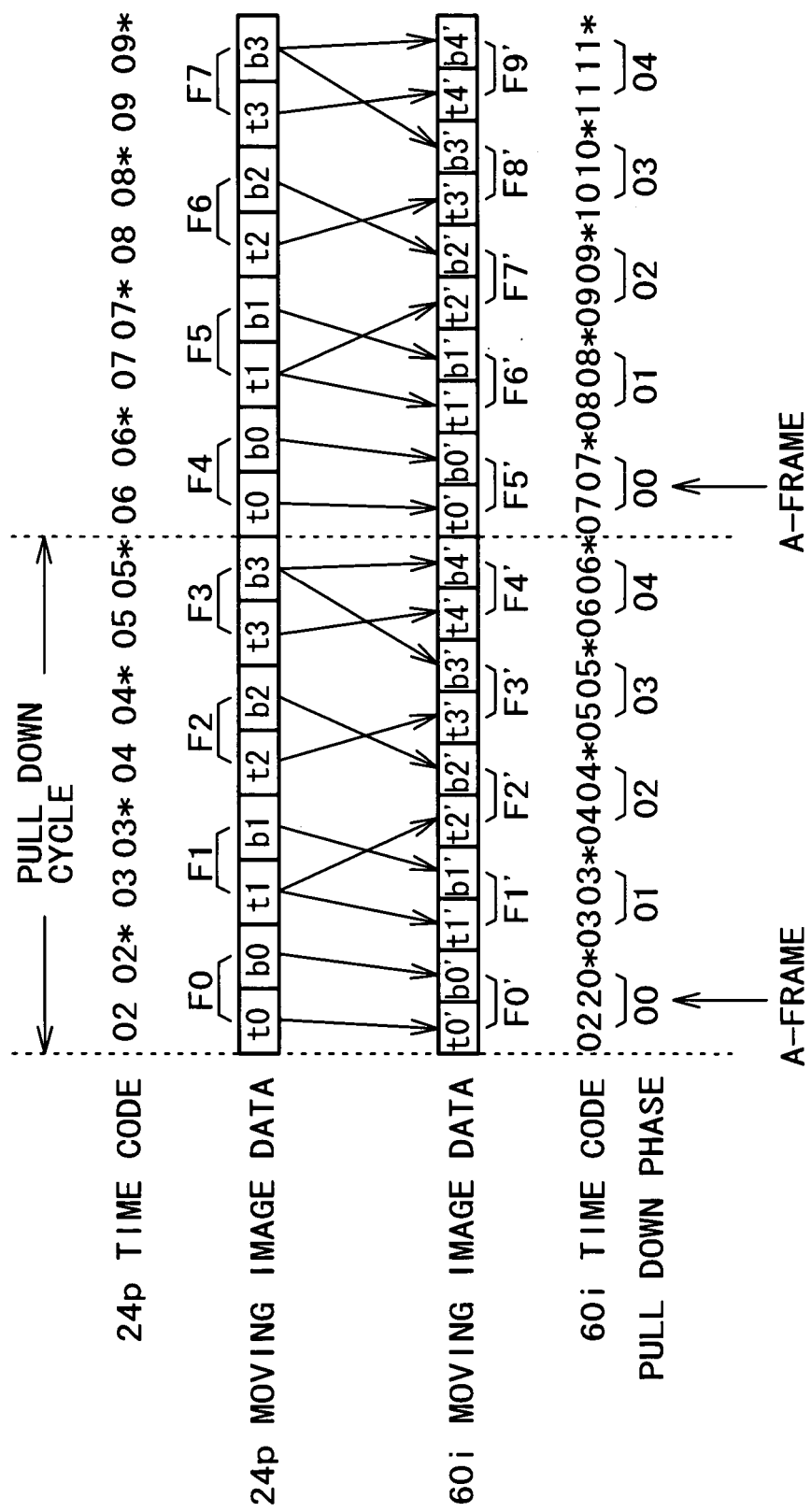
FIG. 6 is a further drawing explaining 2-3 pull down.
Figure 7:
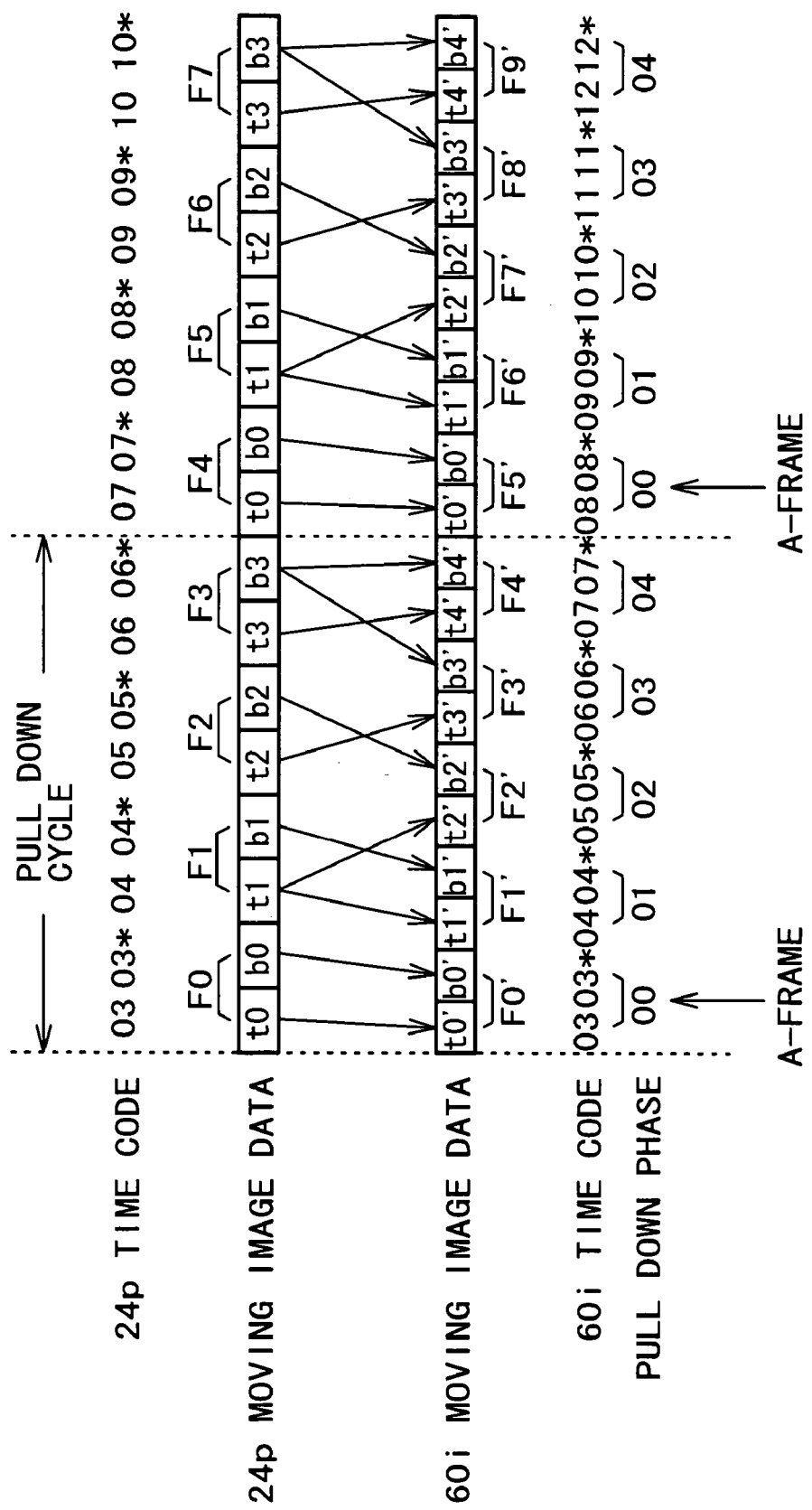
FIG. 7 is a drawing explaining 2-3 pull down.
Figure 8:
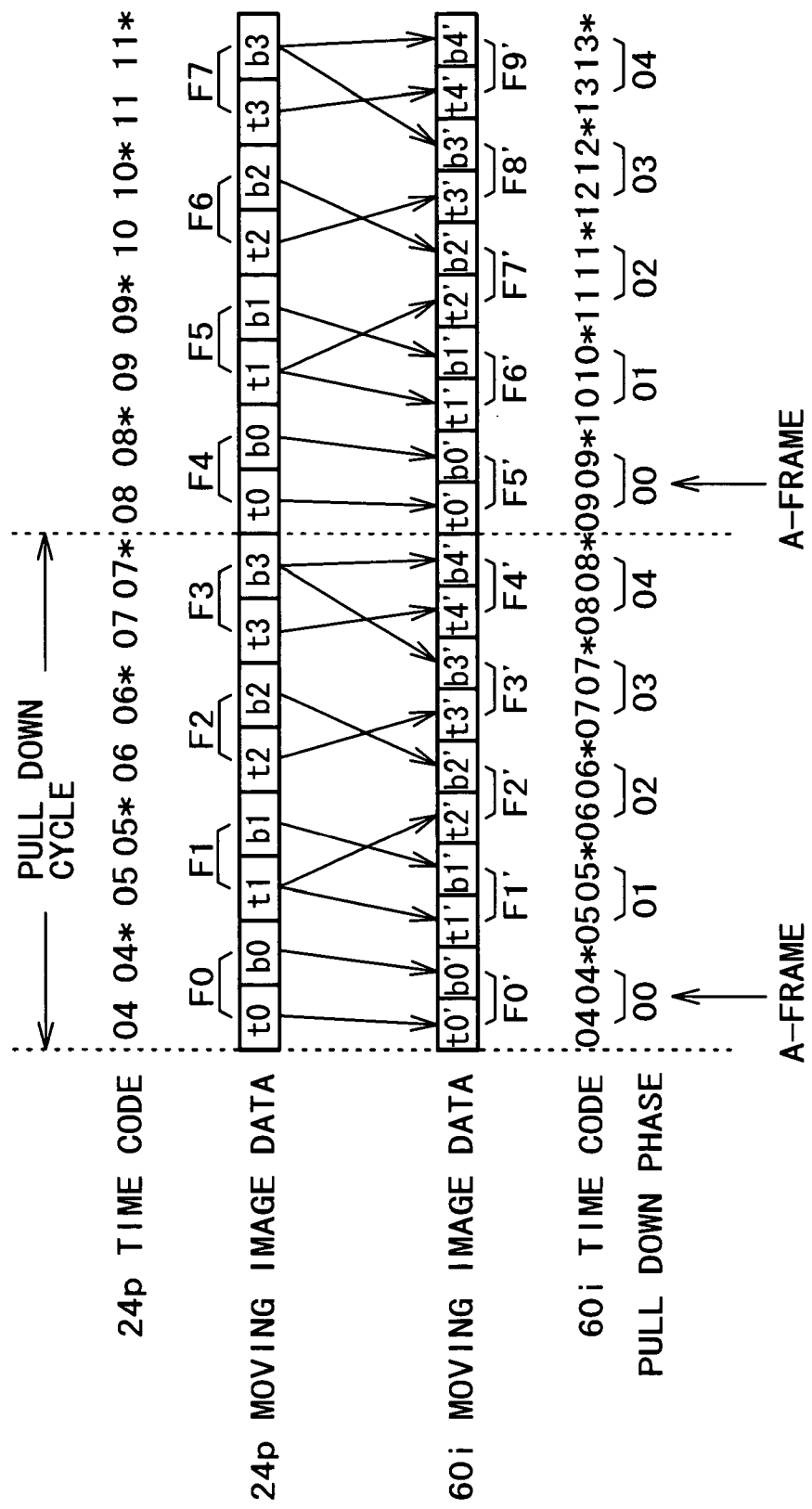
FIG. 8 is another drawing explaining 2-3 pull down.

For example, 2-3 pull down processing can be carried out with the frame of "00:00:00:01" taken as the top frame within the pull down cycle, as illustrated in FIG. 5. Further, 2-3 pull down processing can be carried out with the frame of "00:00: 00:02" taken as the top frame within the pull down cycle, as illustrated in FIG. 6. 2-3 pull down processing can be carried out with the frame of "00:00:00:03" taken as the top frame within the pull down cycle, as illustrated in FIG. 7. 2-3 pull down processing can be carried out with the frame of "00:00: 00:04" taken as the top frame within the pull down cycle, as illustrated in FIG. 8. 2-3 pull down processing can be carried out with the frame of "00:00:00:05" taken as the top frame within the pull down cycle, as illustrated in FIG. 9.

If the time code for the top frame within the pull down cycle is shifted by an amount equivalent to one pull down cycle, the same time code as before shifting comes to the top frame within the pull down cycle.

To take an example, consideration will be given to the moving image data obtained by 2-3 pull down processing, illustrated in FIG. 4. In this example, A-frame is the frame whose 60i time code is "00:00:00:00" and the frame whose 60i time code is "00:00:00:05." Thereafter, the frames whose 60i time code is "00:00:00:10," "00:00:00:15," "00:00:00: 20," "00:00:00:25," . . . are taken as A-frame though these frames are not shown. Thus, the frames whose 60i time code's frame unit portion is divisible by 5 are taken as A-frame.

Figure 9:
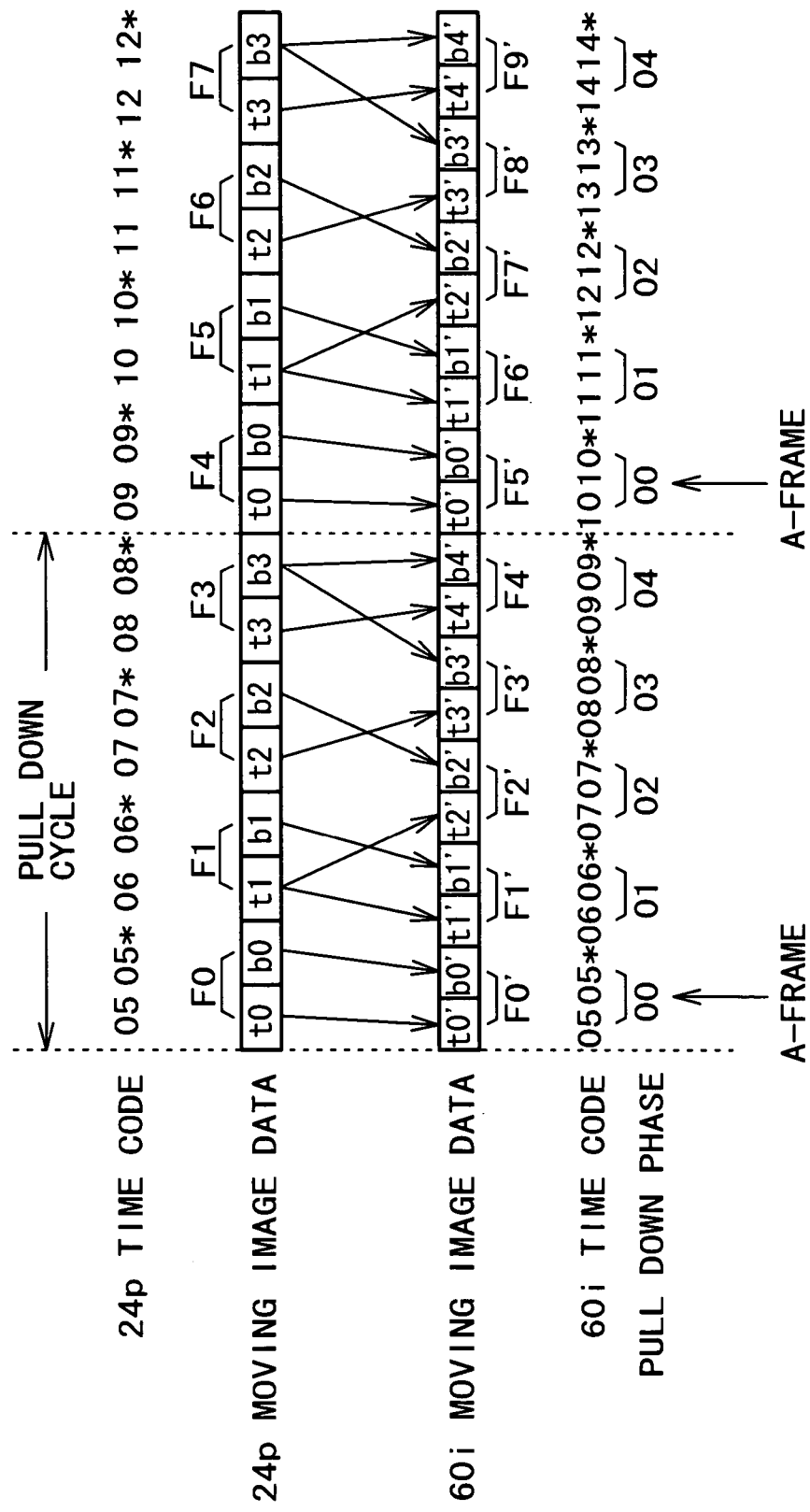
FIG. 9 is a further drawing explaining 2-3 pull down.

FIG. 9 illustrates a state in which the time code for the top frame within the pull down cycle illustrated in FIG. 4 is shifted by an amount equivalent to the pull down cycle. Consideration will be given to the moving image data obtained by 2-3 pull down processing, illustrated in FIG. 9. In this example, A-frame is the frame whose 60i time code is "00: 00:00:05" and the frame whose 60i time code is "00:00:00: 10." Thereafter, the frames whose 60i time code is "00:00:00: 15," "00:00:00:20," "00:00:00:25," . . . are taken as A-frame though these frames are not shown. Thus, the frames whose 60i time code's frame unit portion is divisible by 5 are taken as A-frame.

More specific description will be given. Five frames in the 60i moving image data correspond to one pull down cycle.

Therefore, if the top frame within the pull down cycle is shifted by an amount equivalent to five frames (i.e. an amount equivalent to one cycle), the top frame within the pull down cycle comes to the same position. In this case, therefore, A-frame is the same frame.

As mentioned above, when the set position of the top frame within the pull down cycle is shifted by an amount equivalent to one cycle, the resulting position of the top frame is matched with the original set position. Consequently, if the frame whose 60i time code is "00:00:00:00" is taken as A-frame, the A-frame phase is set to "00." If the frame whose 60i time code is "00:00:00:01" is taken as A-frame, the A-frame phase is set to "01." If the frame whose 60i time code is "00:00:00:02" is taken as A-frame, the A-frame phase is set to "02." If the frame whose 60i time code is "00:00:00:03" is taken as A-frame, the A-frame phase is set to "03." If the frame whose 60i time code is "00:00:00:04" is taken as A-frame, the A-frame phase is set to "04."

The phase setting unit 64 sets the A-frame phase to any of "00" to "04," and notifies the frame conversion unit 62 and the NRT metadata processing unit 67 of the set A-frame phase. The phase setting unit 64 may be shipped with the A-frame phase set in advance, or may be constituted so that the A-frame phase is set by the user.

With respect to each frame in the moving image data at 30 fps generated by the frame conversion unit 62, the RT metadata processing unit 66 generates real time metadata (hereafter, abbreviated as "RT metadata") and outputs it. The RT metadata includes the time code (e.g. 60i time code in FIG. 4) for that frame, and a flag which indicate whether the moving image data at 30 fps generated by the frame conversion unit 62 is of non-drop frame or of drop frame. The time code included in the RT metadata is LTC (Linear Time Code).

The NRT metadata processing unit 67 generates non-real time metadata (hereafter, abbreviated as "NRT metadata") based on the following: the RT metadata outputted from the RT metadata processing unit 66 and the A-frame phase notified by the phase setting unit 64. The NRT metadata corresponds to the whole of one clip (a series of pieces of data generated for the cycle of time from start to end of recording). Then, the NRT metadata processing unit 67 outputs the NRT metadata.

The management file processing unit 68 generates a management file corresponding to one clip and outputs it.

Figure 10:
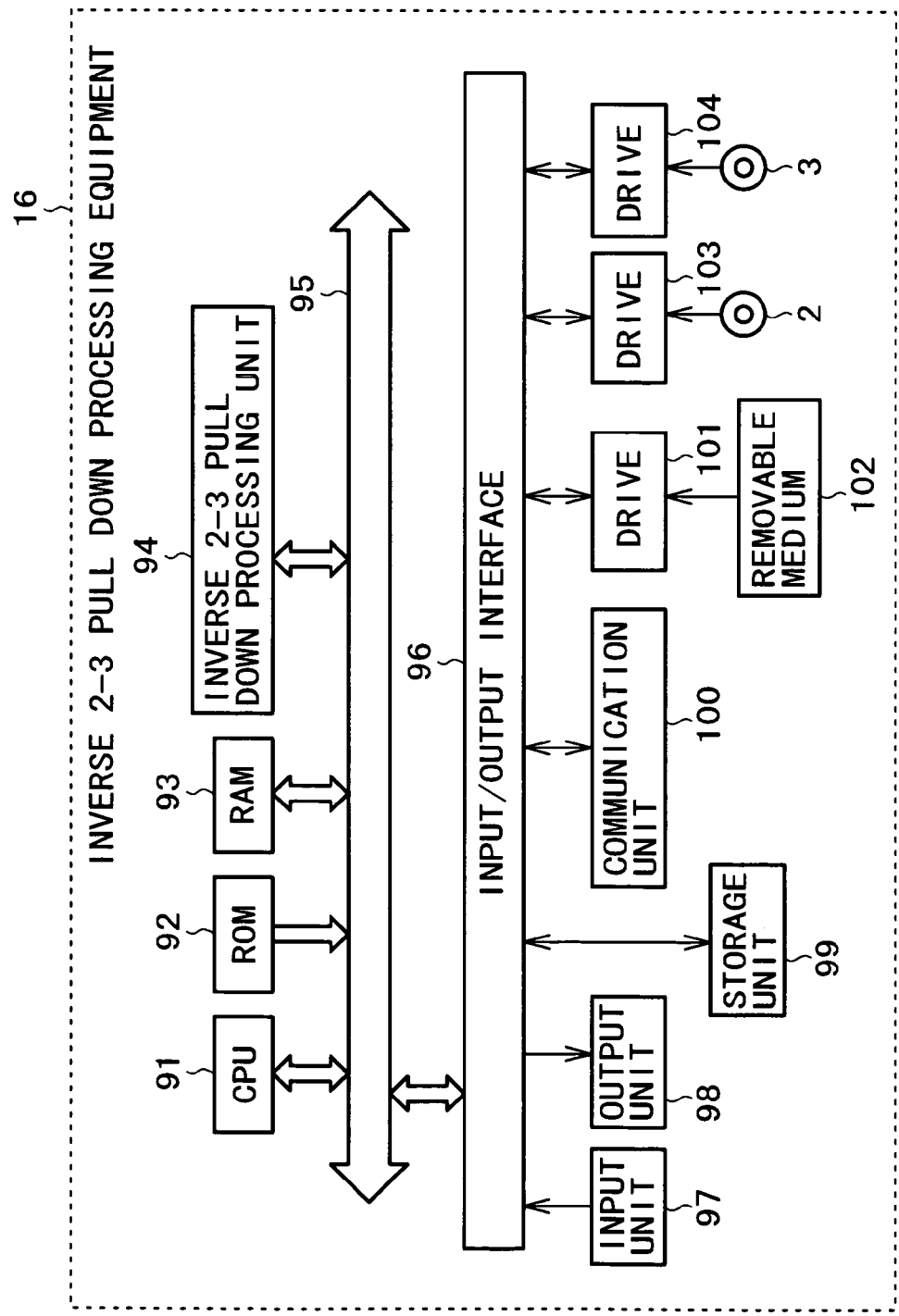
FIG. 10 is a block diagram illustrating an example of the internal configuration of the inverse 2-3 pull down processing equipment in FIG. 1.

FIG. 10 illustrates an example of the internal configuration of the inverse 2-3 pull down processing equipment 16.

The CPU 91 of the inverse 2-3 pull down processing equipment 16 performs varied processing according to programs stored in ROM 92. In RAM 93, data and programs required for the CPU 91 to perform the varied processing are stored as appropriate.

An inverse 2-3 pull down processing unit 94 carries out inverse 2-3 pull down processing on the 60i (59.94i for drop frame) moving image data read out of the optical disk 2 loaded in a drive 103, and generates 24p moving image data. The generated 24p moving image data is recorded on the optical disk 3 by a drive 104.

The CPU 91, ROM 92, RAM 93, and inverse 2-3 pull down processing unit 94 are connected with one another through a bus 95. The bus 95 is also connected with an input/output interface 96.

The input/output interface 96 is connected with an input unit 97 comprising a keyboard and a mouse, and outputs a signal, inputted at the input unit 97, to the CPU 91. The input/output interface 96 is also connected with an output unit 98 comprising a display, speaker, and the like.

Further, the input/output interface 96 is connected with the following: a storage unit 99 comprising a hard disk, EEPROM, and the like; and a communication unit 100 which communicates data to and from other devices through a network, such as the Internet and LAN. A drive 101 is used to write or read data to or from a removable medium 102, including a magnetic disk, optical disk, magneto-optic disk, or recording medium, such as semiconductor memory.

Further, the input/output interface 96 is connected with a drive 103 and a drive 104. The drive 103 reads 60i (59.94i for drop frame) moving image data or the like out of the optical disk 2 loaded therein. The drive 104 records the 24p moving image data, generated by the inverse 2-3 pull down processing unit 94, on the optical disk 3.

Figure 11:
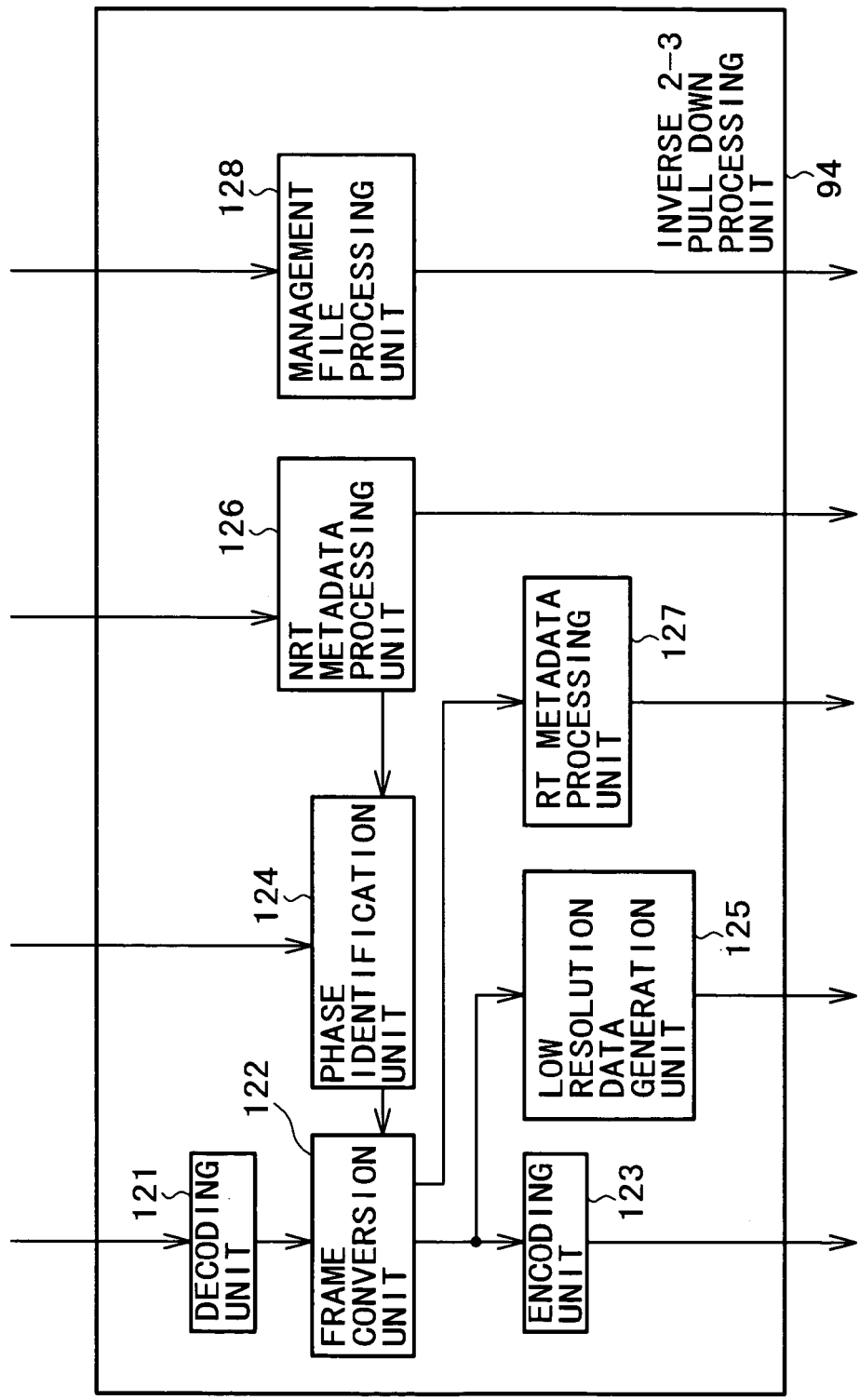
FIG. 11 is a block diagram illustrating an example of the internal configuration of the inverse 2-3 pull down processing unit in FIG. 10.

FIG. 11 illustrates an example of the internal configuration of the inverse 2-3 pull down processing unit 94.

As illustrated in FIG. 11, the inverse 2-3 pull down processing unit 94 comprises a decoding unit 121, frame conversion unit 122, encoding unit 123, phase identification unit 124, low resolution data generation unit 125, NRT metadata processing unit 126, RT metadata processing unit 127, and management file processing unit 128.

The decoding unit 121 decodes moving image data encoded by such an encoding method as MPEG2, and supplies the decoded image data to the frame conversion unit 122. More specific description will be given. The 60i (59.94i for drop frame) moving image data recorded on the optical disk 2 is encoded by such an encoding method as MPEG2. Therefore, when supplied with this moving image data, the decoding unit 121 performs decoding processing corresponding to the encoding method. Then, the decoding unit 121 outputs the frame data of the decoded moving image to the frame conversion unit 122.

The frame conversion unit 122 carries out inverse 2-3 pull down processing on the 60i (59.94i for drop frame) moving image data supplied from the decoding unit 121, and generates 24p moving image data. Then, the unit 122 outputs the generated 24p moving image data to the encoding unit 123 and the low resolution data generation unit 125. When carrying out inverse 2-3 pull down processing, the frame conversion unit 122 identifies the pull down phase of each frame in the moving image data based on A-frame notified by the phase identification unit 124.

The encoding unit 123 encodes the moving image data, supplied from the frame conversion unit 122, by such an encoding method as MPEG2, and outputs the encoded data.

The low resolution data generation unit 125 generates low resolution data from the moving image data supplied from the frame conversion unit 122, and outputs it.

The NRT metadata processing unit 126 reads the NRT metadata recorded on the optical disk 2 together with the 60i (59.94i for drop frame) moving image data through the drive 103. Then, the unit 126 outputs information about A-frame phase and the like to the phase identification unit 124. At the same time, the unit 126 generates NRT metadata including information about the 24p moving image data obtained by inverse 2-3 pull down processing, and outputs the NRT metadata.

With respect to each frame in the moving image data at 24 fps generated by the frame conversion unit 122, the RT metadata processing unit 127 generates RT metadata including the time code for that frame, and outputs it. The time code included in the RT metadata is LTC.

The management file processing unit 128 generates a management file corresponding to one clip and outputs it.

FIG. 12 illustrates an example of the positions in which data is recorded on the optical disk 2. In FIG. 12, audio annulus data 141 is audio data, such as PCM (Pulse Code Modulation) file. Image annulus data 142 is 60i (59.94i for drop frame) moving image data. Low resolution annulus data 143 is low resolution data. Realtime annulus metadata 144 is RT metadata. On the optical disk 2, NRT metadata 145 is also recorded.

In FIG. 12, the audio annulus data 141, image annulus data 142, low resolution annulus data 143, and Realtime annulus metadata 144 corresponding to similar time frames for playback are recorded on the optical disk 2 as follows: the audio annulus data 141, image annulus data 142, low resolution annulus data 143, and Realtime annulus metadata 144 are recorded in forwarder positions on the optical disk 2 in this order of priority. To take an example, consideration will be given based on the audio annulus data to which the highest priority is given. If audio annulus data corresponding to some playback time period is recorded, the following are recorded subsequently to the audio annulus data: the image annulus data, low resolution annulus data, and Realtime annulus metadata corresponding to time frames for playback similar to the above playback time period. 991

From the foregoing, the pieces of data are recorded on the optical disk 2 from the inner radius side toward the outer radius side, as illustrated in FIG. 12 while the following order is repeated: the audio annulus data 141 to the image annulus data 142 to the low resolution annulus data 143 to the Realtime annulus metadata 144.

Further, NRT metadata 145 which does not require real time property is recorded in an area other than those for the above-mentioned pieces of annulus data.

The NRT metadata 145 can be recorded in any position on the optical disk 2. For example, the NRT metadata 145 may be recorded between annulus data and annulus data, as illustrated in FIG. 13A. In the example illustrated in FIG. 13A, the pieces of data are recorded as follows: a plurality of sets of annulus data 150 comprising the audio annulus data 151, image annulus data 152, low resolution annulus data 153, and Realtime annulus metadata 154 are recorded. Thereafter, the NRT metadata 161 is recorded, and other sets of annulus data are subsequently recorded.

The NRT metadata is recorded after the audio annulus data, image annulus data, low resolution annulus data, and RT metadata are recorded. With this timing, therefore, the NRT metadata 161 is recorded subsequently to the last annulus data 150 already recorded. Then, annulus data recorded in the next recording operation started is recorded so that it follows the last NRT metadata 161 already recorded.

At this time, the Realtime annulus metadata 154 contains LTC 155 corresponding to the audio annulus data 151 and the image annulus data 152 included in the same annulus data. As a result, the LTC 155 is recorded in proximity to the audio annulus data 151 and image annulus data 152 corresponding to the LTC 155. Thus, the following advantages are brought: when the LTC 155 is read in a playback of the audio annulus data 151 and image annulus data 152 included in the annulus data 150, the seek time can be shortened. Thus, the speed at which the LTC 155 is read can be enhanced.

The NRT metadata may be recorded in a lump in an area other than the areas where the annulus data is stored, as illustrated in FIG. 13B, for example. The example illustrated in FIG. 13B will be described: annulus data 170-1 comprises audio annulus data 171-1, image annulus data 172-1, low resolution annulus data 173-1, and Realtime annulus metadata 174-1. Annulus data 170-2 comprises audio annulus data 171-2, image annulus data 172-2, low resolution annulus data 173-2, and Realtime annulus metadata 174-2. NRT metadata comprises NRT metadata 181-1, NRT metadata 181-2, and NRT metadata 181-3. As illustrated in the figure, these pieces of NRT metadata are recorded in a lump in an area other than the areas in which the pieces of annulus data are recorded.

In this case, the NRT metadata is recorded in an area other than the areas where the audio annulus data, image annulus data, low resolution annulus data, and Realtime annulus metadata are recorded after these pieces of annulus data are recorded.

The NRT metadata comprises metadata which does not require real time property, and in general, seek time need not be considered. Therefore, it can be disposed in any physical position in the storage area on the optical disk 2. For example, one piece of NRT metadata may be dispersedly recorded in a plurality of positions.

Next, description will be given to a file system which manages each piece of data recorded on the optical disk 2, and the directory structure of and files in the file system.

Any file system maybe used for managing the data recorded on the optical disk 2. For example, a file system in UDF (Universal Disk Format) or ISO9660 (International Organization for Standardization 9660). If a magnetic disk, such as hard disk, is used in place of the optical disk 2, any of the following file systems may be used: FAT (File Allocation Tables) file system, NTFS (New Technology File System), HFS (Hierarchical File System) and UFS (Unix (registered trademark) File System). Or, a dedicated file system may be used.

Figure 14:
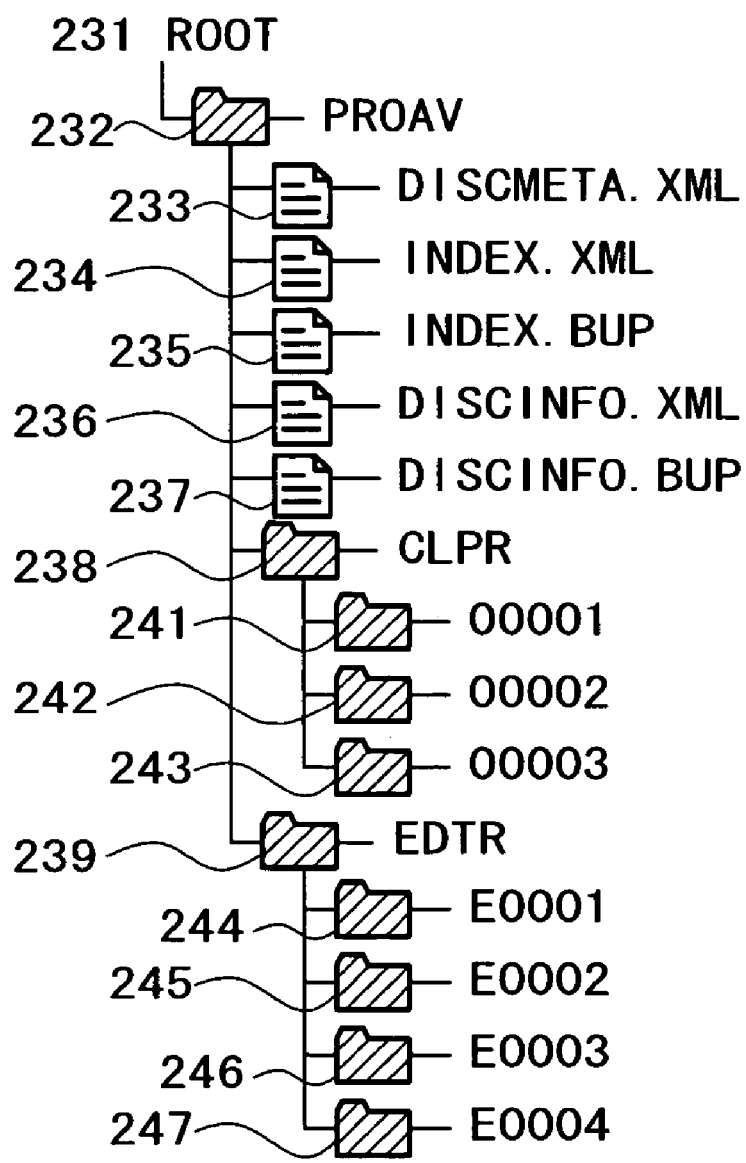
FIG. 14 is a drawing illustrating an example of a directory structure for managing data under a file system.

In this file system, the data recorded on the optical disk 2 is managed in the directory structure and files illustrated in FIG. 14.

In FIG. 14, the root directory (ROOT) 231 is provided with PROAV directory 232. The PROAV directory 232 has lower level directories in which information about essence data, such as moving image data and audio data, edit lists which indicate the result of editing of essence data, and the like are placed. The root directory 231 is also provided with configuration table data and the like (now shown).

The PROAV directory 232 is provided with a disk metafile (DISCMETA.XML) 233 and an index file (INDEX.XML) 234 and an index file (INDEX.BUP) 235. The disk metafile (DISCMETA.XML) 233 is a file which holds the following: the titles and comments for all the essence data recorded on the optical disk 2, and information on the paths of image data corresponding to the representative picture which is a frame representing all the moving image data recorded on the optical disk 2. The index file (INDEX.XML) 234 and the index file (INDEX.BUP) 235 hold management information for managing all the clips and edit lists recorded on the optical disk 2 and the like. The index file 235 is a replica of the index file 234. The reliability is enhanced by providing two files.

The PROAV directory 232 is further provided with a disk information file (DISCINFO.XML) 236 and a disk information file (DISCINFO.BUP) 237. The disk information file (DISCINFO.XML) 236 and disk information file (DISCINFO.BUP) 237 are files which hold metadata for the whole of the data recorded on the optical disk 2, that is, information on disk attributes, playback start position, or the like. The disk information file 237 is a replica of the disk information file 236. The reliability is enhanced by providing two files. However, the following constitution maybe adopted: if any of these pieces of information is updated, only the disk information file 236 is updated.

In addition to the above-mentioned files, the PROAV directory 232 is provided with the following directories: a clip root directory (CLPR) 238 having lower level directories in which data on clips is placed; and an edit list root directory (EDTR) 239 having lower level directories in which data on edit lists is placed.

In the clip root directory 238, the data on the clips recorded on the optical disk 2 is placed in different directories on a clip-by-clip basis and is managed. In the example illustrated in FIG. 14, pieces of data on three clips are divided and placed into three corresponding directories for the purpose of management: clip directory (C0001) 241, clip directory (C0002) 242, and clip directory (C0003) 243. The pieces of data on the clip recorded on the optical disk 2 in the first place are managed as files in the directories under the clip directory 241. The pieces of data on the clip recorded on the optical disk 2 in the second place are managed as files in the directories under the clip directory 242. The pieces of data on the clip recorded on the optical disk 2 in the third place are recorded as files in the directories under the clip directory 243.

In the edit list root directory 239, the edit lists recorded on the optical disk 2 are placed in different directories on an edit operation-by-edit operation basis and are managed. In the example illustrated in FIG. 14, four edit lists are divided and placed into four corresponding directories for the purpose of management: edit list directory (E0001) 244, edit list directory (E0002) 245, edit list directory (E0003) 246, and edit list directory (E0004) 247. The edit list which indicates the result of the first edit operation on the clips recorded on the optical disk 2 is managed as files in the directories under the edit list directory 244. The edit list which indicates the result of the second edit operation is managed as files in the directories under the edit list directory 245. The edit list which indicates the result of the third edit operation is managed as files in the directories under the edit list directory 246. The edit list which indicates the result of the fourth edit operation is managed as files in the directories under the edit list directory 247.

Figure 15:
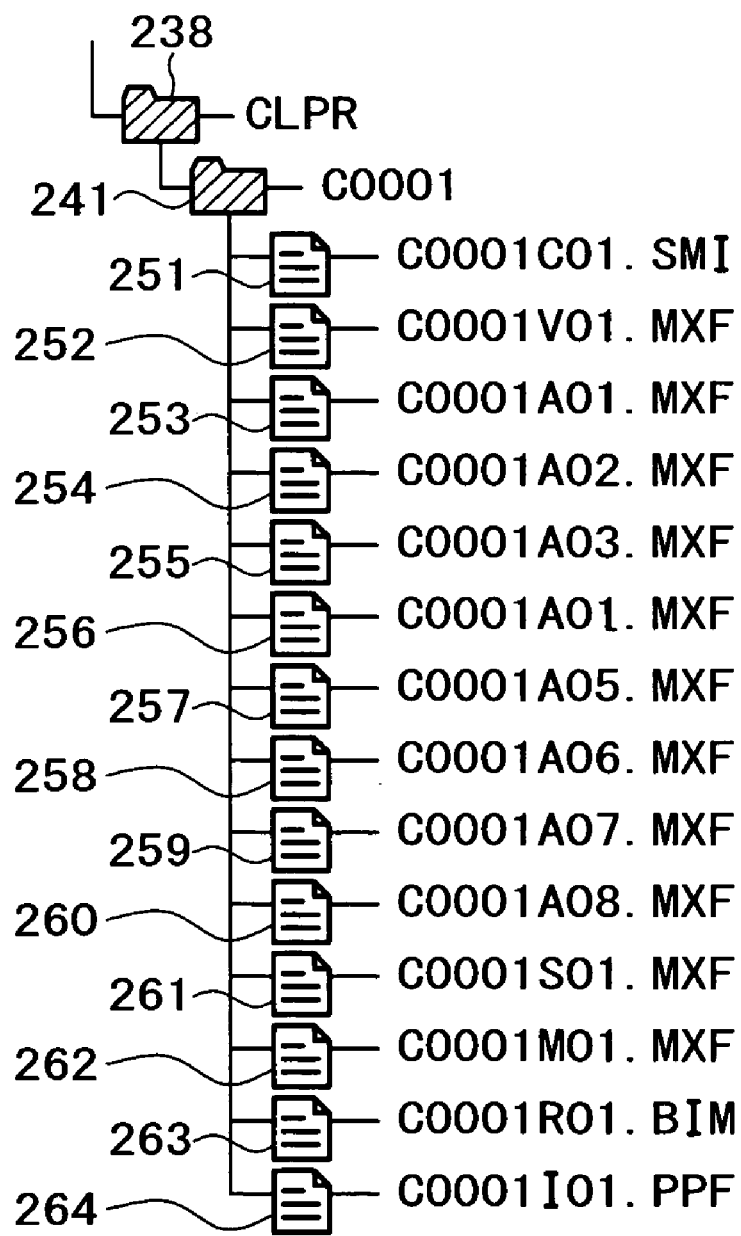
FIG. 15 is a drawing illustrating a more detailed example of the constitution of the directory structure illustrated in FIG. 14.

In the above-mentioned directories under the clip directory 241 provided under the clip root directory 238, the pieces of data on the clip recorded on the optical disk 2 in the first place are placed as files, as illustrated in FIG. 15, and are managed.

In the example illustrated in FIG. 15, the following files are placed in the clip directory 241: a clip information file (C0001C01.SMI) 251 which is a file for managing this clip; a moving image data file (C0001V01.MXF) 252 which is a file holding the moving image data of this clip; audio data files (C0001A01.MXF to C0001A08.MXF) 253 to 260 which are eight files respectively holding the audio data of this clip for respective channels; a low resolution data file (C0001S01.MXF) 261 which is a file holding low resolution data corresponding to the moving image data of this clip; an NRT metadata file (C0001M01.XML) 262 which is a file holding NRT metadata (The NRT metadata is metadata which corresponds to the essence data of this clip, not requiring real time property and including a conversion table for bringing LTC and frame number into correspondence with each other.); an RT metadata file (C0001R01.BIM) 263 which is a file holding RT metadata corresponding to the essence data of this clip (The RT metadata is metadata requiring real time property and including LTC.); a picture pointer file (C0001I01.PPF) 264 which is a file in which the frame structure of the moving image data file 252 (For example, the frame structure includes information about compression format with respect to each picture in MPEG or the like, and information such as offset address relative to the top of file.); and the like.

In the example illustrated in FIG. 15, the moving image data, low resolution data, and RT metadata, which are data requiring real time property when in a playback, are respectively managed as one file. Thereby, increase in read time is prevented.

The audio data also requires real time property when in a playback. To cope with increase in the number of channels, such as 7.1 channels, eight channels are provided for sound, and the pieces of audio data for the channels are respectively managed as different files. This turns out as follows: in the above description, the audio data is managed as eight files. However, the constitution of the present invention is not limited to this: the number of files corresponding to the audio data may be not more than 7 or not less than 9.

This is the same with the image data, low resolution data, and frame metadata. These data may be respectively managed as two or more files depending on the circumstances.

Further, in the example illustrated in FIG. 15, the NRT metadata not requiring real time property is managed as files different from those for the RT metadata requiring real time property. This is in order to prevent unnecessary metadata to be read when moving image data and the like are normally played back. Thus, the processing time for playback and loads required for the processing can be reduced.

To provide versatility, the NRT metadata file 262 is described in XML (extensible Markup Language). To reduce the processing time for playback and loads required for the processing, the RT metadata file 263 is constituted as a BIM file which is obtained by compiling an XML file.

The configuration of files in the clip directory 241 illustrated in FIG. 15 as an example can be applied to all the clip directories corresponding to the clips recorded on the optical disk 2. That is, the file configuration illustrated in FIG. 15 as an example can be applied to the other clip directories 242 and 243 illustrated in FIG. 14. Therefore, the description of the file configuration in these clip directories will be omitted.

Up to this point, the files included in a clip directory corresponding to one clip have been described. However, the file configuration is not limited to the foregoing. The files can be configured in any way as long as the NRT metadata file corresponding to the clip concerned exists in a directory under the corresponding clip directory.

Figure 16:
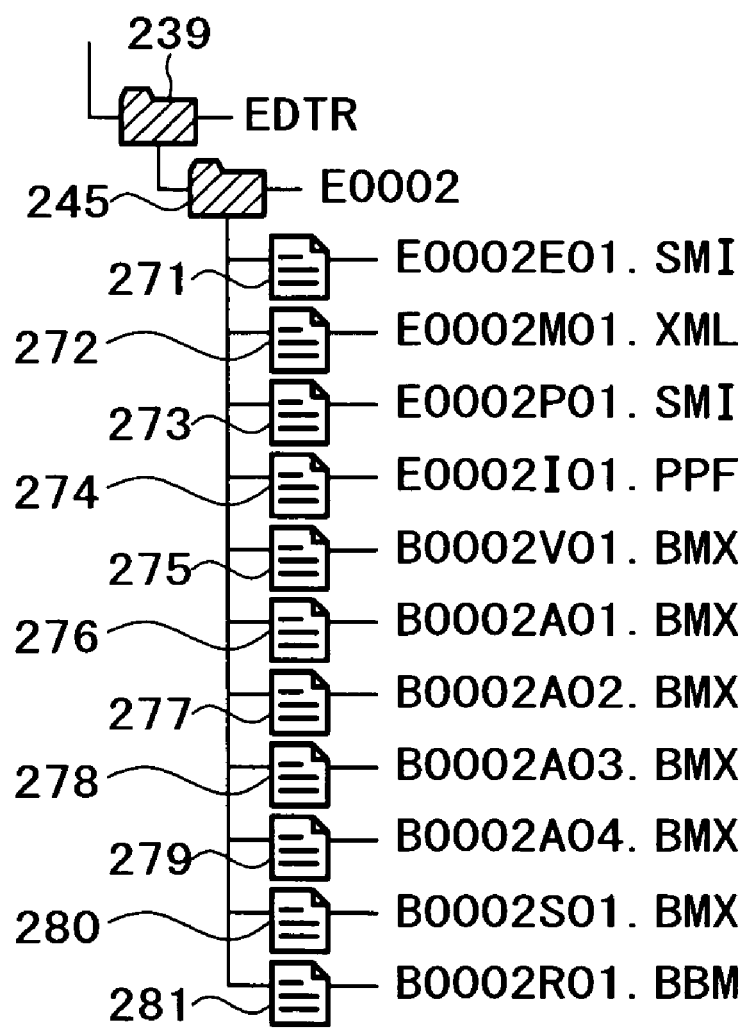
FIG. 16 is another drawing illustrating a more detailed example of the constitution of the directory structure illustrated in FIG. 14.

Next, description will be given to an example of the configuration of files in a directory under the edit list root directory 239 illustrated in FIG. 14. In the above-mentioned directories under the edit list directory 245 provided in the edit list root directory 239, the pieces of data on an edit list are placed as files, as illustrated in FIG. 16, and are managed. The edit list is information on the result of the second edit operation on the data on the clips recorded on the optical disk 2.

In the example illustrated in FIG. 16, the following files are placed in the edit list directory 245: an edit list file (E0002E01.SMI) 271 which is a file for managing this edit result (edit list); a clip metadata file (E0002M01.XML) 272 for edit list which is a file holding clip metadata corresponding to the edited essence data (the portion of the essence data of all the clips used in edition which portion is extracted as edited data), or clip metadata newly generated based on the clip metadata; a playlist file (E0002P01.SMI) 273 which is a file holding such information as playback procedure (playlist) for the essence data based on this edit result (edit list); a picture pointer file (C0001I01.PPF) 274 for playlist which is a file wherein the frame structure of the moving image data played back based on the playback procedure held in the playlist file 273 (For example, the frame structure includes information about compression format with respect to each picture in MPEG or the like, and information such as offset address relative to the top of file.); a moving image data file (B0002V01.BMX) 275 for playlist which is a file holding moving image data for ensuring real-time playback based on the playback procedure (playlist) in the playlist file 273; audio data files (B0002A01.BMX to B0002A04.BMX) 276 to 279 for playlist which are four files holding audio data for ensuring real-time playback based on the playback procedure (playlist) in the playlist file 273; a low resolution data file (B0002S01.BMX) 280 for playlist which is a file holding low resolution data for ensuring real-time playback based on the playback procedure (playlist) in the playlist file 273; an RT metadata file (B0002R01.BBM) 281 for playlist which is a file holding frame metadata for ensureing real-time playback based on the playback procedure (playlist) in the playlist file 273; and the like.

In the example illustrated in FIG. 16, the NRT metadata not requiring real time property is managed as files different from those for the RT metadata requiring real time property. This is in order to prevent unnecessary metadata to be read when moving image data and the like are played back (edit result is reproduced) using the playback procedure (playlist). Thus, the processing time for playback and loads required for the processing can be reduced.

As described later, the NRT metadata file 272 for edit list is a file holding new NRT metadata generated based on the NRT metadata on the clips used in editing according to edit result. (In other words, the new metadata is generated based on the NRT metadata files residing in the directories under the clip root directory 238.) An example will be taken. When edit operation is performed, portions corresponding to the edited essence data are extracted from the NRT metadata held in the NRT metadata file 262 in FIG. 15. Using them, new NRT metadata wherein the edited essence data is taken as one clip is reconstituted, and it is managed as an NRT metadata file for edit list. More specific description will be given. The new NRT metadata wherein edited essence data is taken as one clip is added to the edited essence data, and that NRT metadata is managed as one NRT metadata file for edit list. Therefore, this NRT metadata file for edit list is generated each time edit operation is performed.

To provide versatility, the NRT metadata file 272 for edit list is described in XML.

The moving image data held in the moving image data file 275 for playlist is data extracted from moving image data corresponding to the clips managed in the directories under the clip root directory 238 in FIG. 15. The audio data held in the audio data files 276 to 279 for playlist is data extracted from audio data corresponding to the clips managed in the directories under the clip root directory 238. The low resolution data held in the low resolution data file 280 for playlist is data extracted from low resolution data corresponding to the clips managed in the directories under the clip root directory 238. The RT metadata held in the RT metadata file 281 for playlist is data extracted from RT metadata corresponding to the clips managed in the directories under the clip root directory 238. They are data corresponding to edit result. These pieces of data are read when playback operation is performed based on the playback procedure (playlist) held in the playlist file 273. In playback processing based on playlists, the number of files to be read can be reduced by providing such pieces of data corresponding to edit result. Thus, the processing time and loads required for the processing can be reduced.

The moving image data, low resolution data, and frame metadata may be respectively managed as a plurality of files depending on the circumstances. Similarly, the number of files corresponding to the audio data may be not more than 3 or not less than 5.

To reduce the processing time for playback and loads required for the processing, the RT metadata file 281 for playlist is constituted as a BBM file corresponding to BIM file which is obtained by compiling an XML file.

The configuration of files in the edit list directory 245 illustrated in FIG. 16 as an example can be applied to all the edit lists (edit results). That is, the file configuration illustrated in FIG. 16 as an example can be applied to the other edit list directories 244, 246, and 247 illustrated in FIG. 14. Therefore, the description of the file configuration in these edit list directories will be omitted.

Up to this point, the files included in an edit list directory corresponding to one edit operation have been described. However, the file configuration is not limited to the foregoing. The files can be configured in any way as long as the NRT metadata file for edit list corresponding to the edit operation concerned exists in a directory under the corresponding edit list directory.

Up to this point, referring to FIG. 12 to FIG. 16, data recorded on the optical disk 2 has been described. Data is also recorded on the optical disk 1 and the optical disk 3 as on the optical disk 2. However, while the moving image data files recorded on the optical disk 2 is of 60i (or 59.94i), the moving image data files recorded on the optical disk 1 and the optical disk 3 are of 24p.

Next, referring to the flowchart in FIG. 17, description will be given to the 2-3 pull down processing carried out by the 2-3 pull down processing equipment 13.

Figure 17:
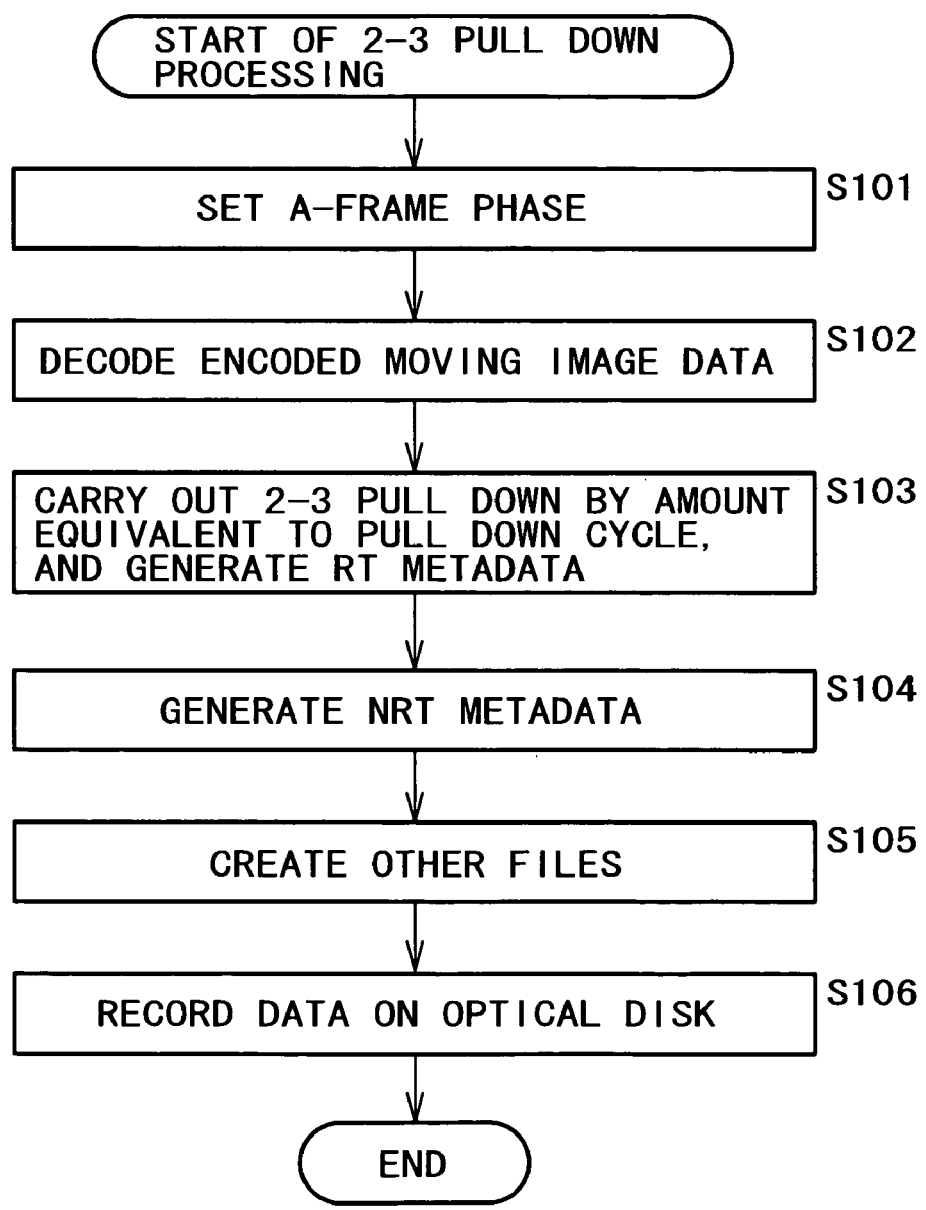
FIG. 17 is a flowchart explaining 2-3 pull down processing.

At Step 101 in FIG. 17, the phase setting unit 64 sets the A-frame phase to any of "00" to "04" according to, for example, an instruction from the user. Then, the phase setting unit 64 notifies the frame conversion unit 62 and NRT metadata processing unit 67 of A-frame phase information which indicates which phase is established.

At Step 102, the decoding unit 61 decodes encoded 24p moving image data read out of the optical disk 1 by the drive 43, and outputs the decoded moving image data to the frame conversion unit 62.

At Step 103, the frame conversion unit 62 carries out 2-3 pull down on the 24p moving image data, decoded by the decoding unit 61 at Step 102. Thereby, the frame conversion unit 62 generates 60i (59.94i for drop frame) moving image data so that its A-frame phase will be matched with that notified by the phase setting unit 64.

More specific description will be given. If the A-frame phase is set to "00," the frame conversion unit 62 carries out 2-3 pull down so that the 24p time code "00:00:00:00" corresponds to the pull down phase "00" as illustrated in FIG. 4. If the A-frame phase is set to "01," the frame conversion unit 62 carries out 2-3 pull down so that the 24p time code "00:00:00:01" corresponds to the pull down phase "00" as illustrated in FIG. 5. If the A-frame phase is set to "02," the frame conversion unit 62 carries out 2-3 pull down so that the 24p time code "00:00:00:02" corresponds to the pull down phase "00" as illustrated in FIG. 6. If the A-frame phase is set to "03," the frame conversion unit 62 carries out 2-3 pull down so that the 24p time code "00:00:00:03" corresponds to the pull down phase "00" as illustrated in FIG. 7. If the A-frame phase is set to "04," the frame conversion unit 62 carries out 2-3 pull down so that the 24p time code "00:00:00:04" corresponds to the pull down phase "00" as illustrated in FIG. 8.

Then, the frame conversion unit 62 outputs the generated moving image data to the encoding unit 63 and the low resolution data generation unit 65. The encoding unit 63 successively encodes the moving image data supplied from the frame conversion unit 62. The low resolution data generation unit 65 successively generates low resolution data from the moving image data supplied from the frame conversion unit 62.

At Step 103, the frame conversion unit 62 carries out 2-3 pull down by an amount equivalent to the pull down cycle, as illustrated in FIG. 4, for example. When the 60i (59.94i for drop frame) moving image data has been 2-3 pulled down by the amount equivalent to one pull down cycle, the frame conversion unit 62 notifies the RT metadata processing unit 66 of that. Each time notified that 2-3 pull down has been carried out by the amount equivalent to one cycle by the frame conversion unit 62, the RT metadata processing unit 66 operates as follows: it generates 60i time code (LTC) for five frames (10 fields) generated by 2-3 pull down, as illustrated in FIG. 4, for example, and generates RT metadata including the LTC.

As mentioned above, at Step 103, 2-3 pull down is carried out on a series of the 24p moving image data and the RT metadata is generated. At Step 104, thereafter, the NRT metadata processing unit 66 generates NRT metadata based on the following: the A-frame phase notified by the phase setting unit 64, the LTC included in the RT metadata generated by the RT metadata processing unit 66, and the like. In this NRT metadata, the A-frame phase is described.

FIG. 18 to FIG. 22 illustrates an example of the description in the NRT metadata. FIG. 19 illustrates the description following the description in FIG. 18; FIG. 20 illustrates the description following the description in FIG. 19; FIG. 21 illustrates the description following the description in FIG. 20; and FIG. 22 illustrates the description following the description in FIG. 21.

The description [<?xml version="1.0" encoding="UTF-8"?>] on the 1st line in FIG. 18 indicates the following: this NRT metadata is described in XML (extensible Markup Language) and the character code is UTF-8 (8-bit UCS Transformation Format). On the 2nd to 7th lines in FIG. 18, the root elements of this NRT metadata are described.

The description [<TargetMaterial umidRef="060A2B340101010501010D12130000000000001044444-484EE EE00E0188E130B" status="OK"/>] on the 9th to 11th lines in FIG. 18 indicates the following: information about the audio data and moving image data (hereafter, audio data and moving image data will be also generically referred to as "AV data") involved in this NRT metadata. Especially, [umidRef="060A2B340101010501010D12130000000000-001044444484E EEE00E0188E130B"] indicates the UMID (Unique Material Identifier) of the AV data. The description [<Duration value="500"/>] on the 12th line in FIG. 18 indicates the effective recording length of the AV data.

On the 13th to 25th lines in FIG. 18, an LTC change point table is described. LTC change point is a point at which the LTC is discontinuous in a series of AV data. Therefore, LTC change point table is a table in which change points where the LTC is discontinuous in a series of AV data are listed and described.

The description [<CreationDate isSummerTime="false" value="2002-10-01T12:34:56+09:00"/>] on the 1st line in FIG. 19 following FIG. 18 indicates the date of creation of the AV data involved in this NRT metadata. The description [<LastUpdate isSummerTime="false" value="2002-10-01T23:45:01+09:00"/>] on the 2nd line in FIG. 19 indicates the last update date of this AV data.

The description [<TypicalUbit value="00008080ABCDEF98"/>] on the 3rd line in FIG. 19 indicates the value of user bit included in the LTC recorded as RT metadata. The description [<KeyFrame frameCount="2"/>] on the 4th line in FIG. 19 indicates the frame which is the representative picture of the AV data.

On the 5th line in FIG. 19 to the 3rd line in FIG. 21, an UMID conversion table which indicates the discontinuities in UMID is described.

On the 4th to 20th lines in FIG. 21, a KLV data conversion table which indicates the discontinuities in KLV data is described. KLV data is KLV encoded data comprising key data (Key), length data (Length), and value data (Value). This format is in accordance with the SMPTE 335M/RP214.

On the 21st line in FIG. 21 to the 3rd line in FIG. 22, information about the format of the moving image data is described.

More specific description will be given. The description [<VideoFormat>] on the 21st line in FIG. 21 indicates that information about the format of the moving image data is described on the 22nd and following lines.

The description [<VideoRecPort port="SDTI-CP"/>] on the 22nd line in FIG. 21 indicates the transmission method for transmitting moving image data, audio data, multiplexing data, metadata, and the like to external equipment. In this example, as transmission method, SDTI-CP (Serial Data Transport Interface Content Package) is described.

On the 23rd to 24th lines in FIG. 21, [<VideoFrame videocodec="IMX50" captureFps="24p" recFps="59.94" formatFps="59.94i"/>] is described. In this description, [videoCodec="IMX50"] indicates the encoding method for the moving image data. In this example of description, as encoding method for moving image data, [IMX50] is described. IMX50 indicates that encoding is carried out only by I (Intra) picture in MPEG and the frame rate is 50 Mbps. [captureFps="24p"] indicates the frequency at which optical signals are read through the image pickup devices (e.g. CCDs (Charged Coupled Devices)) of the imaging device 11. More specific description will be given. The image pickup devices convert light into electricity and store it, and read the stored signals at a predetermined frequency. There are two methods for reading signals from image pickup devices in a plane: progressive scan and interlace scan. In [captureFps="24p"], the description [p] of [24p] indicates the reading method. That is, [p] indicates progressive scan. [24] indicates the reading frequency and that signals are read 24 times per second. The reading frequency is not limited to 24 times/second, and can be made higher or lower than 24 times/second. In case of interlace scan, [i] is described in place of [p].

The description [recFps="59.94"] indicates the field rate of moving image data at which the 2-3 pull down processing equipment 13 records the moving image data on the optical disk 2. In this example of description, as field rate, [59.94] is described. This indicates that the moving image data is recorded at 59.94 fields/second. The description [formatFps="59.94i"] indicates the field rate as a format for the moving image data and the scan method by which the 2-3 pull down processing equipment 13 records the moving image data on the optical disk 2. More specific description will be given. In [59.94i], [59.94] indicates that the field rate is 59.94 fields/second, and [i] indicates that the scan method is interlace scan. In case of non-drop frame, [60i] is described. If the scan method is not interlace scan but progressive scan, [p] is described in place of [i].

On the 25th line in FIG. 21, [<VideoLayout pixel="640" numOfVerticalLine="480" aspectRatio="4:3">] is described. In this description, [VideoLayout] indicates that information about the disposition with which the moving image data is displayed and the like is described. [pixel="640"] indicates the number of pixels contained in each horizontal line of images (frames) displayed based on the moving image data. In this example of description, as the number of pixels contained in each horizontal line, [640] is described. This indicates that the horizontal line comprises 640 pixels. [numOfVerticalLine="480"] indicates the number of horizontal lines of images (frames) displayed based on the moving image data. In this example of description, as the number of horizontal lines, [480] is described. This indicates that there are 480 horizontal lines. [aspectRatio="4:32"] indicates the aspect ratio. In this example of description, it is indicated that the aspect ratio is 4:3.

[<PullDownSetting pullDownKind="2-3" A-frame-Phase="00"/>] is described on the 1st line in FIG. 22 following FIG. 21. In this description, [PullDownSetting] indicates that there is a description related to pull down. [pullDownKind="2-3"] indicates the kind of pull down, and in this example of description, as the type of pull down, [2-3] is described. This indicates that the moving image data is subjected to 2-3 pull down processing. In this embodiment, 2-3 pull down is taken as an example, and thus [2-3] is described in FIG. 21. In addition to [2-3], however, the following can be described as the type of pull down: [1-1], [2-2], [2-3-3-2], [24-25], and [other]. If [pullDownKind="1-1"] is described, that means that the moving image data is not subjected to any pull down processing. If [pullDownKind="2-2"] is described, that indicates the following: the moving image data is recorded by interlace scan as a recording format but progressing scan is used when the moving image data is displayed. If [pullDownKind="2-3-3-2"] is described, that indicates that the moving image data is subjected to 2-3-3-2 pull down processing. If [pullDownKind="24-25"] is described, that indicates that the moving image data is subjected to 24-25 pull down processing. If [pullDownKind="other"] is described, that indicates that the moving image data is pulled down by any other method than described above. That is, the kind of pull down used to pull down the moving image data is described as [pullDownKind]. [aframePhase="00"] indicates the description of the A-frame phase established at Step 101, and in this example of description, it is indicated that the A-frame phase is [00]. In addition to [00], any of [01], [02], [03], and [04] can be described as A-frame phase.

As mentioned above, the A-frame phase is recorded in NRT metadata. Thus, when inverse 2-3 pull down processing is carried out later, the repeat fields can be excluded with accuracy, and the 24p moving image data can be restored.

The description [</VideoLayout>] on the 2nd line in FIG. 22 indicates that the description related to [VideoLayout], started on the 25th line in FIG. 21, ends here. The description [</VideoFormat>] on the 3rd line in FIG. 22 indicates that the description related to [VideoFormat], started on the 21st line in FIG. 21, ends here.

On the 5th to 10th lines in FIG. 22, information about the audio data is described. On the 11th to 15th lines in FIG. 22, information about equipment used to generate the AV data is described. On the 16th line in FIG. 22, the name of the creator of the AV data is described. In the example of description illustrated in FIG. 22, [ . . . . . . ] is described as creator's name. In reality, however, the creator's mane is described in alphabetical characters. On the 17th to 19th lines in FIG. 22, the tile of the AV data created is described. The description [<Description>An example text annotation about the target essence.</Description>] on the 20th line in FIG. 22 indicates text data described by the user. The description [</NonRealTimeMeta>] on the 21st line in FIG. 22 indicates that the description of the NRT metadata ends.

The example illustrated in FIG. 17 will be described again. At Step 105, the management file processing unit 68 generates a clip information file. The management file processing unit 68 also generates a picture pointer file.

At Step 106, the 2-3 pull down processing unit 34 supplies the drive 44 with the following in predetermined order: the 60i (59.94i for drop frame) moving image data encoded by the encoding unit 63; the low resolution data generated by the low resolution data generation unit 65; the RT metadata generated by the RT metadata processing unit 66; the NRT metadata generated by the NRT metadata processing unit 67; and the clip information file and picture pointer file generated by the management file processing unit 68. The drive 44 records the supplied data in the predetermined physical areas on the optical disk 2.

2-3 pull down processing is carried out as mentioned above.

Here, referring to FIG. 23 to FIG. 25, description will be given to the relation between the A-frame phase, pull down phase, and time code in the moving image data generated by the above 2-3 pull down processing.

FIG. 23 illustrates the relation between A-frame phase and time code for 60i, that is, non-drop frame. On the 1st line in FIG. 23, successive frames in 24p moving image data are indicated by rectangles. More specific description will be given. Each box marked with [xx], [xx+1], [xx+2], [xx+3], [xx+4], [xx+5], or [xx+6] represents one frame. The 3rd line in FIG. 23 indicates a state in which repeat fields are added by 2-3 pull down processing. That is, in 2-3 pull down processing, a repeat field is added every other frame. Therefore, a repeat field is added to [B] and [D] frames. As a result, the length of Boxes [B] and [D] is 3/2 times the length of Boxes [A] and [C].

The 6th to 8th lines indicate the correspondence between 60i time code and pull down phase established if the A-frame phase after 2-3 pull down processing is set to [00]. The 6th to 8th lines represent the correspondence at time code of [00:00:00:00] and the following values. More specific description will be given. On the 7th line, only the frame unit portion of the 60i time code is indicated on a frame-by-frame basis in the order of [00], [01], [02], [03], [04], [05], [06], [07], [08], and [09]. On the 8th line, the pull down phase is indicated in the order of [00], [01], [02], [03], [04], [00], [01], [02], [03], and [04] in correspondence with the time code on the 7th line. This indicates the following: the pull down phase at time code [00:00:00:00] is [00]; the pull down phase at time code [00:00:00:01] is [01]; the pull down phase at time code [00:00:00:02] is [02]; the pull down phase at time code [00:00:00:03] is [03]; the pull down phase at time code [00:00:00:04] is [04]; the pull down phase at time code [00:00:00:05] is [00]; the pull down phase at time code [00:00:00:06] is [01]; the pull down phase at time code [00:00:00:07] is [02]; the pull down phase at time code [00:00:00:08] is [03]; and the pull down phase at time code [00:00:00:09] is [04].

The 10th and 11th lines indicate the correspondence between 60i time code and pull down phase established if the A-frame phase after 2-3 pull down processing is set to [01]. The 10th and 11th line represent the correspondence at time code of [00:00:00:01] and the following values. More specific description will be given. On the 10th line, only the frame unit portion of the 60i time code is indicated on a frame-by-frame basis in the order of [01], [02], [03], [04], [05], [06], [07], [08], and [09] . On the 11th line, the pull down phase is indicated in the order of [00], [01], [02], [03], [04], [00], [01], [02], and [03] in correspondence with the time code on the 10th line. This indicates the following: the pull down phase at time code [00:00:00:01] is [00]; the pull down phase at time code [00:00:00:02] is [01]; the pull down phase at time code [00:00:00:03] is [02]; the pull down phase at time code [00:

00:00:04] is [03]; the pull down phase at time code [00:00:00:05] is [04]; the pull down phase at time code [00:00:00:06] is [05]; the pull down phase at time code [00:00:00:07] is [01]; the pull down phase at time code [00:00:00:08] is [02]; and the pull down phase at time code [00:00:00:09] is [03].

The 13th and 14the lines indicate the correspondence between 60i time code and pull down phase established if the A-frame phase after 2-3 pull down processing is set to [02]. The 13th and 14th lines represent the corresponding at time code of [00:00:00:02] and the following values. More specific description will be given. On the 13th line, only the frame unit portion of the 60i time code is indicated on a frame-by-frame basis in the order of [02], [03], [04], [05], [06], [07], [08], and [09]. On the 14th line, the pull down phase is indicated in the order of [00], [01], [02], [03], [04], [00], [01], and [02] in correspondence with the time code on the 13th line. This indicates the following: the pull down phase at time code [00:00:00:02] is [00]; the pull down phase at time code [00:00:00:03] is [01]; the pull down phase at time code [00:00:00:04] is [02]; the pull down phase at time code [00:00:00:05] is [03]; the pull down phase at time code [00:00:00:06] is [04]; the pull down phase at time code [00:00:00:07] is [00]; the pull down phase at time code [00:00:00:08] is [01]; and the pull down phase at time code [00:00:00:09] is [02].

The 16th to 17th lines indicate the correspondence between 60i time code and pull down phase established if the A-frame phase after 2-3 pull down processing is set to [03]. The 16th and 17th lines represent the correspondence at time code of [00:00:00:03] and the following values. More specific description will be given. On the 16th line, only the frame unit portion of the 60i time code is indicated on a frame-by-frame basis in the order of [03], [04], [05], [06], [07], [08], and [09]. On the 17th line, the pull down phase is indicated in the order of [00], [01], [02], [03], [04], [00], and [01] in correspondence with the time code on the 16th line. This indicates the following: the pull down phase at time code [00:00:00:03] is [00]; the pull down phase at time code [00:00:00:04] is [01]; the pull down phase at time code [00:00:00:05] is [02]; the pull down phase at time code [00:00:00:06] is [03]; the pull down phase at time code [00:00:00:07] is [04]; the pull down phase at time code [00:00:00:08] is [00]; and the pull down phase at time code [00:00:00:09] is [01].

The 19th and 20th lines indicate the correspondence between 60i time code and pull down phase established if the A-frame phase after 2-3 pull down processing is set to [04]. The 19th and 20th lines represent the correspondence at time code of [00:00:00:04] and the following values. More specific description will be given. On the 19th line, only the frame unit portion of the 60i time code is indicated on a frame-by-frame basis in the order of [04], [05], [06], [07], [08], and [09]. On the 20th line, the pull down phase is indicated in the order of [00], [01], [02], [03], [04], and [00] in correspondence with the time code on the 19th line. This indicates the following: the pull down phase at time code [00:00:00:04] is [00]; the pull down phase at time code [00:00:00:05] is [01]; the pull down phase at time code [00:00:00:06] is [02]; the pull down phase at time code [00:00:00:07] is [03]; the pull down phase at time code [00:00:00:08] is [04]; and the pull down phase at time code [00:00:00:09] is [00].

The 22nd and 23rd lines indicate the correspondence between 60i time code and pull down phase established if the A-frame phase after 2-3 pull down processing is set to [00]. The 22nd and 23rd lines represent the correspondence at time code of [00:00:00:05] and the following values. More specific description will be given. On the 22nd line, only the frame unit portion of the 60i time code is indicated on a frame-by-frame basis in the order of [05], [06], [07], [08], [09], and [10]. On the 23rd line, the pull down phase is indicated in the order of [00], [01], [02], [03], [04], and [00] in correspondence with the time code on the 22nd line. This indicates the following: the pull down phase at time code [00:00:00:05] is [00]; the pull down phase at time code [00:00:00:06] is [01]; the pull down phase at time code [00:00:00:07] is [02]; the pull down phase at time code [00:00:00:08] is [03]; the pull down phase at time code [00:00:00:09] is [04]; and the pull down phase at time code [00:00:00:10] is [00].

The 25th and 26th lines indicate the correspondence between 60i time code and pull down phase established if the A-frame phase after 2-3 pull down processing is set to [01]. The 25th and 26th lines represent the correspondence at time code of [00:00:00:06] and the following values. More specific description will be given. On the 25th line, only the frame unit portion of the 60i time code is indicated on a frame-by-frame basis in the order of [06], [07], [08], [09], [10], and [11]. On the 26th line, the pull down phase is indicated in the order of [00], [01], [02], [03], [04], and [00] in correspondence with the time code on the 25th line. This indicates the following: the pull down phase at time code [00:00:00:06] is [00]; the pull down phase at time code [00:00:00:07] is [01]; the pull down phase at time code [00:00:00:08] is [02]; the pull down phase at time code [00:00:00:09] is [03]; the pull down phase at time code [00:00:00:10] is [04]; and the pull down phase at time code [00:00:00:11] is [00].

The 28th to 30th lines indicate the correspondence between 60i time code and pull down phase established if the A-frame phase after 2-3 pull down processing is set to [03]. The 28th to 30th lines represent the correspondence at time code of [00:00:59:28] and the following values. More specific description will be given. On the 29th line, only the frame unit portion of the 60i time code is indicated on a frame-by-frame basis in the order of [28], [29], [00], [01], [02], and [03]. On the 30th line, the pull down phase is indicated in the order of [00], [01], [02], [03], [04], and [00] in correspondence with the time code on the 29th line. This indicates the following: the pull down phase at time code [00:00:59:28] is [00]; the pull down phase at time code [00:00:59:29] is [01]; the pull down phase at time code [00:01:00:00] is [02]; the pull down phase at time code [00:01:00:01] is [03]; the pull down phase at time code [00:01:00:02] is [04]; and the pull down phase at time code [00:01:00:03] is [00].

The 32nd and 33rd lines indicate the correspondence between 60i time code and pull down phase established if the A-frame phase after 2-3 pull down processing is set to [04]. The 32nd and 33rd lines represent the correspondence at time code of the [00:00:59:29] and the following values. More specific description will be given. On the 32nd line, only the frame unit portion of the 60i time code is indicated on a frame-by-frame basis in the order of [29], [00], [01], [02], [03], and [04]. On the 33rd line, the pull down phase is indicated in the order of [00], [01], [02], [03], [04], and [00] in correspondence with the time code on the 32nd line. This indicates the following: the pull down phase at time code [00:00:59:29] is [00]; the pull down phase at time code [00:01:00:00] is [01]; the pull down phase at time code [00:01:00:01] is [02]; the pull down phase at time code [00:01:00:02] is [03]; the pull down phase at time code [00:01:00:03] is [04]; and the pull down phase at time code [00:01:00:04] is [00].

The 35th and 36th lines indicate the correspondence between 60i time code and pull down phase established if the A-frame phase after 2-3 pull down processing is set to [00]. The 35th and 36th lines represent the correspondence at time code of [00:01:00:00] and the following values. More specific description will be given. On the 35th line, only the frame unit portion of the 60i time code is indicated on a frame-by-frame basis in the order of [00], [01], [02], [03], [04], and [05]. On the 36th line, the pull down phase is indicated in the order of [00], [01], [02], [03], [04], and [00] in correspondence with the time code on the 35th line. This indicates the following: the pull down phase at time code [00:01:00:00] is [00]; the pull down phase at time code [00:01:00:01] is [01]; the pull down phase at time code [00:01:00:02] is [02]; the pull down phase at time code [00:01:00:03] is [03]; the pull down phase at time code [00:01:00:04] is [04]; and the pull down phase at time code [00:01:00:05] is [00].

The 38th and 39th lines indicate the correspondence between 60i time code and pull down phase established if the A-frame phase after 2-3 pull down processing is set to [01]. The 38th and 39th lines represent the correspondence at time code of [00:01:00:01] and the following values. More specific description will be given. On the 38th line, only the frame unit portion of the 60i time code is indicated on a frame-by-frame basis in the order of [01], [02], [03], [04], [05], and [06]. On the 39th line, the pull down phase is indicated in the order of [00], [01], [02], [03], [04], and [00] in correspondence with the time code on the 38th line. This indicates the following: the pull down phase at time code [00:01:00:01] is [00]; the pull down phase at time code [00:01:00:02] is [01]; the pull down phase at time code [00:01:00:03] is [02]; the pull down phase at time code [00:01:00:04] is [03]; the pull down phase at time code [00:01:00:05] is [04]; and the pull down phase at time code [00:01:00:06] is [00].

The 41st and 42nd lines indicate the correspondence between 60i time code and pull down phase established if the A-frame phase after 2-3 pull down processing is set to [02]. The 41st and 42nd lines represent the correspondence at time code of [00:01:00:02] and the following values. More specific description will be given. On the 41st line, only the frame unit portion of the 60i time code is indicated on a frame-by-frame basis in the order of [02], [03], [04], [05], [06], and [07]. On the 42nd line, the pull down phase is indicated in the order of [00], [01], [02], [03], [04], and [00] in correspondence with the time code on the 41st line. This indicates the following: the pull down phase at time code [00:01:00:02] is [00]; the pull down phase at time code [00:01:00:03] is [01]; the pull down phase at time code [00:01:00:04] is [02]; the pull down phase at time code [00:01:00:05] is [03]; the pull down phase at time code [00:01:00:06] is [04]; and the pull down phase at time code [00:01:00:07] is [00].

In case of non-drop frame, as illustrated in FIG. 23, the remainder obtained by dividing a value, obtained by subtracting the A-frame phase from the value of the frame unit portion of time code, by the pull down cycle (=5) is always taken as pull down phase.

More specific description will be given. If the A-frame phase is [00], the remainder obtained by dividing a value, obtained by subtracting A-frame phase [00] from the value of the frame unit portion of time code, by the pull down cycle (=5) is always taken as pull down phase.

As an example, attention will be focused on the 7th and 8th lines. Here, the remainder (=00) obtained by dividing a value (=00), obtained by subtracting A-frame phase [00] from the value [00] of the frame unit portion, by the pull down cycle (=5) is the value of pull down phase. The remainder (=01) obtained by dividing a value (=01), obtained by subtracting A-frame phase [00] from the value [01] of the frame unit portion, by the pull down cycle (=5) is the value of pull down phase. The remainder (=02) obtained by dividing a value (=02), obtained by subtracting A-frame phase ) from the value [02] of the frame unit portion, by the pull down cycle (=5) is the value of pull down phase. The remainder (=03) obtained by dividing a value (=03), obtained by subtracting A-frame phase [00] from the value [03] of the frame unit portion, by the pull down cycle (=5) is the value of pull down phase. The remainder (=04) obtained by dividing a value (=04), obtained by subtracting A-frame phase [00] from the value [04] of the frame unit portion, by the pull down cycle (=5) is the value of pull down phase. The remainder (=05) obtained by dividing a value (=05), obtained by subtracting A-frame phase [00] from the value [05] of the frame unit portion, by the pull down cycle (=5) is the value of pull down phase. The remainder (=06) obtained by dividing a value (=06), obtained by subtracting A-frame phase [00] from the value [06] of the frame unit portion, by the pull down cycle (=5) is the value of pull down phase. The remainder (=07) obtained by dividing a value (=07), obtained by subtracting A-frame phase [00] from the value [07] of the frame unit portion, by the pull down cycle (=5) is the value of pull down phase. The remainder (=08) obtained by dividing a value (=08), obtained by subtracting A-frame phase [00] from the value [08] of the frame unit portion, by the pull down cycle (=5) is the value of pull down phase. The remainder (=09) obtained by dividing a value (=09), obtained by subtracting A-frame phase [00] from the value [09] of the frame unit portion, by the pull down cycle (=5) is the value of pull down phase. This is the same with the 22nd and 23rd lines and the 35th and 36th lines.

If the A-frame phase is [01] as well, the remainder obtained by dividing a value, obtained by subtracting A-frame phase [01] from the value of the frame unit portion of time code, by the pull down cycle (=5) is always taken as pull down phase.

As an example, attention will be focused on the 10th and 11th lines. Here, the remainder (=00) obtained by dividing a value (=00), obtained by subtracting A-frame phase [01] from the value [01] of the frame unit portion, by the pull down cycle (=5) is the value of pull down phase. The remainder (=01) obtained by dividing a value (=01), obtained by subtracting A-frame phase [01] from the value [02] of the frame unit portion, by the pull down cycle (=5) is the value of pull down phase. The remainder (=02) obtained by dividing a value (=02), obtained by subtracting A-frame phase [01] from the value [03] of the frame unit portion, by the pull down cycle (=5) is the value of pull down phase. The remainder (=03) obtained by dividing a value (=03), obtained by subtracting A-frame phase [01] from the value [04] of the frame unit portion, by the pull down cycle (=5) is the value of pull down phase. The remainder (=04) obtained by dividing a value (=04), obtained by subtracting A-frame phase [01] from the value [05] of the frame unit portion, by the pull down cycle (=5) is the value of pull down phase. The remainder (=00) obtained by dividing a value (=05), obtained by subtracting A-frame phase [01] from the value [06] of the frame unit portion, by the pull down cycle (=5) is the value of pull down phase. The remainder (=01) obtained by dividing a value (=06), obtained by subtracting A-frame phase [01] from the value [07] of the frame unit portion, by the pull down cycle (=5) is the value of pull down phase. The remainder (=02) obtained by dividing a value (=07), obtained by subtracting A-frame phase [01] from the value [08] of the frame unit portion, by the pull down cycle (=5) is the value of pull down phase. The remainder (=03) obtained by dividing a value (=08), obtained by subtracting A-frame phase [01] from the value [09] of the frame unit portion, by the pull down cycle (=5) is the value of pull down phase. This is the same with the 25th and 26th lines and the 38th and 39th lines.

If the A-frame phase is [02] as well, the remainder obtained by dividing a value, obtained by subtracting A-frame phase

[02] from the value of the frame unit portion of time code, by the pull down cycle (=5) is always taken as pull down phase.

As an example, attention will be focused on the 13th and 14th lines. Here, the remainder (=00) obtained by dividing a value (=00), obtained by subtracting A-frame phase [02] from the value [02] of the frame unit portion, by the pull down cycle (=5) is the value of pull down phase. The remainder (=01) obtained by dividing a value (=01), obtained by subtracting A-frame phase [02] from the value [03] of the frame unit portion, by the pull down cycle (=5) is the value of pull down phase. The remainder (=02) obtained by dividing a value (=02), obtained by subtracting A-frame phase [02] from the value [04] of the frame unit portion, by the pull down cycle (=5) is the value of pull down phase. The remainder (=03) obtained by dividing a value (=03), obtained by subtracting A-frame phase [02] from the value [05] of the frame unit portion, by the pull down cycle (=5) is the value of pull down phase. The remainder (=04) obtained by dividing a value (=04), obtained by subtracting A-frame phase [02] from the value [06] of the frame unit portion, by the pull down cycle (=5) is the value of pull down phase. The remainder (=00) obtained by dividing a value (=05), obtained by subtracting A-frame phase [02] from the value [07] of the frame unit portion, by the pull down cycle (=5) is the value of pull down phase. The remainder (=01) obtained by dividing a value (=06), obtained by subtracting A-frame phase [02] from the value [08] of the frame unit portion, by the pull down cycle (=5) is the value of pull down phase. The remainder (=02) obtained by dividing a value (=07), obtained by subtracting A-frame phase [02] from the value [09] of the frame unit portion, by the pull down cycle (=5) is the value of pull down phase. This is the same with the 41st and 42nd lines.

If the A-frame phase is [03] as well, the remainder obtained by dividing a value, obtained by subtracting A-frame phase [03] from the value of the frame unit portion of time code, by the pull down cycle (=5) is always taken as pull down phase.

As an example, attention will be focused on the 16th and 17th lines. Here, the remainder (=00) obtained by dividing a value (=00), obtained by subtracting A-frame phase [03] from the value [03] of the frame unit portion, by the pull down cycle (=5) is the value of pull down phase. The remainder (=01) obtained by dividing a value (=01), obtained by subtracting A-frame phase [03] from the value [04] of the frame unit portion, by the pull down cycle (=5) is the value of pull down phase. The remainder (=02) obtained by dividing a value (=02), obtained by subtracting A-frame phase [03] from the value [05] of the frame unit portion, by the pull down cycle (=5) is the value of pull down phase. The remainder (=03) obtained by dividing a value (=03), obtained by subtracting A-frame phase [03] from the value [06] of the frame unit portion, by the pull down cycle (=5) is the value of pull down phase. The remainder (=04) obtained by dividing a value (=04), obtained by subtracting A-frame phase [03] from the value [07] of the frame unit portion, by the pull down cycle (=5) is the value of pull down phase. The remainder (=00) obtained by dividing a value (=05), obtained by subtracting A-frame phase [03] from the value [08] of the frame unit portion, by the pull down cycle (=5) is the value of pull down phase. The remainder (=01) obtained by dividing a value (=06), obtained by subtracting A-frame phase [03] from the value [09] of the frame unit portion, by the pull down cycle (=5) is the value of pull down phase. This is the same with the 29th and 30th lines.

If the A-frame phase is [04] as well, the remainder obtained by dividing a value, obtained by subtracting A-frame phase [04] from the value of the frame unit portion of time code, by the pull down cycle (=5) is always taken as pull down phase.

As an example, attention will be focused on the 19th and 20th lines. Here, the remainder (=00) obtained by dividing a value (=00), obtained by subtracting A-frame phase [04] form the value [04] of the frame unit portion, by the pull down cycle (=5) is the value of pull down phase. The remainder (=01) obtained by dividing a value (=01), obtained by subtracting A-frame phase [04] form the value [05] of the frame unit portion, by the pull down cycle (=5) is the value of pull down phase. The remainder (=02) obtained by dividing a value (=02), obtained by subtracting A-frame phase [04] form the value [06] of the frame unit portion, by the pull down cycle (=5) is the value of pull down phase. The remainder (=03) obtained by dividing a value (=03), obtained by subtracting A-frame phase [04] form the value [07] of the frame unit portion, by the pull down cycle (=5) is the value of pull down phase. The remainder (=04) obtained by dividing a value (=04), obtained by subtracting A-frame phase [04] form the value [08] of the frame unit portion, by the pull down cycle (=5) is the value of pull down phase. The remainder (=00) obtained by dividing a value (=05), obtained by subtracting A-frame phase [04] form the value [09] of the frame unit portion, by the pull down cycle (=5) is the value of pull down phase. This is the same with the 32nd and 33rd lines.

In case of non-drop frame, as mentioned above, the pull down phase of each frame can be identified by the following expression if the value of the frame unit portion of time code and A-frame phase are known:

$$PP=\{(FF-AP) \bmod PC\} \qquad (1)$$

In Expression (1), however, PP represents the pull down phase; FF represents the value of the frame unit portion of time code; AP represents the value of A-frame phase; and PC represents the number of frames contained in one pull down cycle. [X mod Y] represents the remainder obtained when X÷Y is computed. However, this division is a computation of the order of integer, and the computation is not carried out to the decimal level. That is, {(FF−AP) mod PC} means the remainder obtained when (FF−AP)÷PC is computed in the order of integer.

As mentioned above, the pull down phase of each frame in moving image data which underwent 2-3 pull down processing can be identified if the 60i time code, A-frame phase, and the number of frames contained in the pull down cycle are known. Therefore, when inverse 2-3 pull down processing is carried out later, the repeat fields and the like can be identified with accuracy. As a result, inverse 2-3 pull down processing can be carried out with accuracy, and degradation in picture quality can be prevented during inverse 2-3 pull down.

FIG. 24 and FIG. 25 illustrate the relation between A-frame phase and time code for 59.94i, that is, drop frame. The 1st to 27th lines in FIG. 24 are the same as the 1st to 27th lines in FIG. 23, and the description thereof will be omitted.

The 28th to 30th lines in FIG. 24 indicate the correspondence between 59.94i time code and pull down phase established if the A-frame phase after 2-3 pull down processing is set to [03]. The 28th to 30th lines represent the correspondence at time code of [00:00:59:28] and the following values. More specific description will be given. On the 29th line, only the frame unit portion of the 59.94i time code is indicated on a frame-by-frame basis in the order of [28], [29], [02], [03], [04], and [05]. On the 30th line, the pull down phase is indicated in the order of [00], [01], [02], [03], [04], and [00] in correspondence with the time code on the 29th line. This indicates the following: the pull down phase at time code

[00:00:59:28] is [00]; the pull down phase at time code [00:00:59:29] is [01]; the pull down phase at time code [00:01:00:02] is [02]; the pull down phase at time code [00:01:00:03] is [03]; the pull down phase at time code [00:01:00:04] is [04]; and the pull down phase at time code [00:01:00:05] is [00].

More specific description will be given. In case of drop frame, two time code values from the beginning of the minute, excepting cases where the minute unit portion is [00], [10], [20], [30], [40], or [50], are thinned out (dropped). In other words, time code values whose frame unit portion is [00] or [01] are dropped with the above exception. That is, in case of drop frame, the time code values whose frame unit portion is [00] or [01] are dropped and thus they do not exist. Such time code values include [00:01:00:00], [00:01:00:01], [00:02:00:00], [00:02:00:01], [00:03:00:00], [00:03:00:01], [00:04:00:00], [00:04:00:01], [00:05:00:00], [00:05:00:01], [00:06:00:00], [00:06:00:01], [00:07:00:00], [00:07:00:01], [00:08:00:00], [00:08:00:01], [00:09:00:00], [00:09:00:01], [00:11:00:00], [00:11:00:01], . . . . However, if the minute unit portion is [00], [10], [20], [30], [40], or [50], that time code value whose frame unit portion is [00] or [01] is not dropped, as mentioned above. Therefore, the following time code values exist: [00:00:00:00], [00:00:00:01], [00:10:00:00], [00:10:00:01], [00:20:00:00], [00:20:00:01], [00:30:00:00], [00:30:00:01], [00:40:00:00], [00:40:00:01], [00:50:00:00], [00:50:00:01], etc.

The 32nd and 33rd lines in FIG. 24 indicate the correspondence between 59.94i time code and pull down phase established if the A-frame phase after 2-3 pull down processing is set to [04]. The 32nd and 33rd lines represent the correspondence at time code of [00:00:59:29] and the following values. More specific description will be given. On the 32nd line, only the frame unit portion of the 59.94i time code is indicated on a frame-by-frame basis in the order of [29], [02], [03], [04], [05], and [06]. On the 33rd line, the pull down phase is indicated in the order of [00], [01], [02], [03], [04], and [00] in correspondence with the time code on the 32nd line. This indicates the following: the pull down phase at time code [00:00:59:29] is [00]; the pull down phase at time code [00:01:00:02] is [01]; the pull down phase at time code [00:01:00:03] is [02]; the pull down phase at time code [00:01:00:04] is [03]; the pull down phase at time code [00:01:00:05] is [04]; and the pull down phase at time code [00:01:00:06] is [00].

The 35th and 36th lines indicate the correspondence between 59.94i time code and pull down phase established if the A-frame phase after 2-3 pull down processing is set to [00]. The 35th and 36th lines represent the correspondence at time code of [00:01:00:02] and the following values. More specific description will be given. On the 35th line, only the frame unit portion of the 59.94i time code is indicated on a frame-by-frame basis in the order of [02], [03], [04], [05], [06], and [07]. On the 36th line, the pull down phase is indicated in the order of [00], [01], [02], [03], [04], and [00] in correspondence with the time code on the 35th line. This indicates the following: the pull down phase at time code [00:01:00:02] is [00]; the pull down phase at time code [00:01:00:03] is [01]; the pull down phase at time code [00:01:00:04] is [02]; the pull down phase at time code [00:01:00:05] is [03]; the pull down phase at time code [00:01:00:06] is [04]; and the pull down phase at time code [00:01:00:07] is [00].

The 38th and 39th lines indicate the correspondence between 59.94i time code and pull down phase established if the A-frame phase after 2-3 pull down processing is set to [01]. The 38th and 39th lines represent the correspondence at time code of [00:01:00:03] and the following values. More specific description will be given. On the 38th line, only the frame unit portion of the 59.94i time code is indicated on a frame-by-frame basis in the order of [03], [04], [05], [06], [07], and [08]. On the 39th line, the pull down phase is indicated in the order of [00], [01], [02], [03], [04], and [00] in correspondence with the time code on the 38th line. This indicates the following: the pull down phase at time code [00:01:00:03] is [00]; the pull down phase at time code [00:01:00:04] is [01]; the pull down phase at time code [00:01:00:05] is [02]; the pull down phase at time code [00:01:00:06] is [03]; the pull down phase at time code [00:01:00:07] is [04]; and the pull down phase at time code [00:01:00:08] is [00].

The 41st and 42nd lines indicate the correspondence between 59.94i time code and pull down phase established if the A-frame phase after 2-3 pull down processing is set to [02]. The 41st and 42nd lines represent the correspondence at time code of [00:01:00:04] and the following values. More specific description will be given. On the 41st line, only the frame unit portion of the 59.94i time code is indicated on a frame-by-frame basis in the order of [04], [05], [06], [07], [08], and [09]. On the 42nd line, the pull down phase is indicated in the order of [00], [01], [02], [03], [04], and [00] in the correspondence with the time code on the 41st line. This indicates the following: the pull down phase at time code [00:01:00:04] is [00]; the pull down phase at time code [00:01:00:05] is [01]; the pull down phase at time code [00:01:00:06] is [02]; the pull down phase at time code [00:01:00:07] is [03]; the pull down phase at time code [00:01:00:08] is [04]; and the pull down phase at time code [00:01:00:09] is [00].

The 1st and 2nd lines in FIG. 25 indicate the correspondence between 59.94i time code and pull down phase established if the A-frame phase after 2-3 pull down processing is set to [01]. The 1st and 2nd lines represent the correspondence at time code of [00:01:59:28] and the following values. More specific description will be given. On the 1st line, only the frame unit portion of the 59.94i time code is indicated on a frame-by-frame basis in the order of [28], [29], [02], [03], [04], and [05]. On the 2nd line, the pull down phase is indicated in the order of [00], [01], [02], [03], [04], and [00] in correspondence with the time code on the 1st line. This indicates the following: the pull down phase at time code [00:01:59:28] is [00]; the pull down phase at time code [00:01:59:29] is [01]; the pull down phase at time code [00:02:00:02] is [02]; the pull down phase at time code [00:02:00:03] is [03]; the pull down phase at time code [00:02:00:04] is [04]; and the pull down phase at time code [00:02:00:05] is [00].

The 4th and 5th lines indicate the correspondence between 59.94i time code and pull down phase established if the A-frame phase after 2-3 pull down processing is set to [02]. The 4th and 5th lines represent the correspondence at time code of [00:01:59:29] and the following values. More specific description will be given. On the 4th line, only the frame unit portion of the 59.94i time code is indicated on a frame-by-frame basis in the order of [29], [02], [03], [04], [05], and [06]. On the 5th line, the pull down phase is indicated in the order of [00], [01], [02], [03], [04], and [00] in correspondence with the time code on the 4th line. This indicates the following: the pull down phase at time code [00:01:59:29] is [00]; the pull down phase at time code [00:02:00:02] is [01]; the pull down phase at time code [00:02:00:03] is [02]; the pull down phase at time code [00:02:00:04] is [03]; the pull down phase at time code [00:02:00:05] is [04]; and the pull down phase at time code [00:02:00:06] is [00].

The 7th and 8th lines indicate the correspondence between 59.94i time code and pull down phase established if the A-frame phase after 2-3 pull down processing is set to [03]. The 7th and 8th lines represent the correspondence at time code of [00:02:00:02] and the following values. More specific description will be given. On the 7th line, only the frame unit portion of the 59.94i time code is indicated on a frame-by-frame basis in the order of [02], [03], [04], [05], [06], and [07]. On the 8th line, the pull down phase is indicated in the order of [00], [01], [02], [03], [04], and [00] in correspondence with the time code on the 7th line. This indicates the following: the pull down phase at time code [00:02:00:02] is [00]; the pull down phase at time code [00:02:00:03] is [01]; the pull down phase at time code [00:02:00:04] is [02]; the pull down phase at time code [00:02:00:05] is [03]; the pull down phase at time code [00:02:00:06] is [04]; and the pull down phase at time code [00:02:00:07] is [00].

The 10th and 11th lines indicate the correspondence between 59.94i time code and pull down phase established if the A-frame phase after 2-3 pull down processing is set to [04]. The 10th and 11th lines represent the correspondence at time code of [00:02:00:03] and the following values. More specific description will be given. On the 10th line, only the frame unit portion of the 59.94i time code is indicated on a frame-by-frame basis in the order of [03], [04], [05], [06], [07], and [08]. On the 11th line, the pull down phase is indicated in the order of [00], [01], [02], [03], [04], and [00] in correspondence with the time code on the 10th line. This indicates the following: the pull down phase at time code [00:02:00:03] is [00]; the pull down phase at time code [00:02:00:04] is [01]; the pull down phase at time code [00:02:00:05] is [02]; the pull down phase at time code [00:02:00:06] is [03]; the pull down phase at time code [00:02:00:07] is [04]; and the pull down phase at time code [00:02:00:08] is [00].

The 13th and 14th lines indicate the correspondence between 59.94i time code and pull down phase established if the A-frame phase after 2-3 pull down processing is set to [00]. The 13th and 14th lines represent the correspondence at time code of [00:02:00:04] and the following values. More specific description will be given. On the 13th line, only the frame unit portion of the 59.94i time code is indicated on a frame-by-frame basis in the order of [04], [05], [06], [07], [08], and [09]. On the 14th line, the pull down phase is indicated in the order of [00], [01], [02], [03], [04], and [00] in correspondence with the time code on the 13th line. This indicates the following: the pull down phase at time code [00:02:00:04] is ); the pull down phase at time code [00:02:00:05] is [01]; the pull down phase at time code [00:02:00:06] is [02]; the pull down phase at time code [00:02:00:07] is [03]; the pull down phase at time code [00:02:00:08] is [04]; and the pull down phase at time code [00:02:00:09] is [00].

The 17th and 18th lines indicate the correspondence between 59.94i time code and pull down phase established if the A-frame phase after 2-3 pull down processing is set to [00]. The 17th and 18th lines represent the correspondence at time code of [00:03:00:06] and the following values. More specific description will be given. On the 17th line, only the frame unit portion of the 59.94i time code is indicated on a frame-by-frame basis in the order of [06], [07], [08], [09], [10], and [11]. On the 18th line, the pull down phase is indicated in the order of [00], [01], [02], [03], [04], and [00] in correspondence with the time code on the 17th line. This indicates the following: the pull down phase at time code [00:03:00:06] is [00]; the pull down phase at time code [00:03:00:07] is [01]; the pull down phase at time code [00:03:00:08] is [02]; the pull down phase at time code [00:03:00:09] is [03]; the pull down phase at time code [00:03:00:10] is [04]; and the pull down phase at time code [00:03:00:11] is [00].

The 21st and 22nd lines indicate the correspondence between 59.94i time code and pull down phase established if the A-frame phase after 2-3 pull down processing is set to [00] The 21st and 22nd lines represent the correspondence at time code of [00:04:00:08] and the following values. More specific description will be given. On the 21st line, only the frame unit portion of the 59.94i time code is indicated on a frame-by-frame basis in the order of [08], [09], [10], [11], [12], and [13]. On the 22nd line, the pull down phase is indicated in the order of [00], [01], [02], [03], [04], and [00] in correspondence with the time code on the 21st line. This indicates the following: the pull down phase at time code [00:04:00:08] is [00]; the pull down phase at time code [00:04:00:09] is [01]; the pull down phase at time code [00:04:00:10] is [02]; the pull down phase at time code [00:04:00:11] is [03]; the pull down phase at time code [00:04:00:12] is [04]; and the pull down phase at time code [00:04:00:13] is [00].

The 25th and 26th lines indicate the correspondence between 59.94i time code and pull down phase established if the A-frame phase after 2-3 pull down processing is set to [00]. The 25th and 26th lines represent the correspondence at time code of [00:05:00:10] and the following values. More specific description will be given. On the 25th line, only the frame unit portion of the 59.94i time code is indicated on a frame-by-frame basis in the order of [10], [11], [12], [13], [14], and [15]. On the 26th line, the pull down phase is indicated in the order of [00], [01], [02], [03], [04], and [00] in correspondence with the time code on the 25th line. This indicates the following: the pull down phase at time code [00:05:00:10] is [00]; the pull down phase at time code [00:05:00:11] is [01]; the pull down phase at time code [00:05:00:12] is [02]; the pull down phase at time code [00:05:00:13] is [03]; the pull down phase at time code [00:05:00:14] is [04]; and the pull down phase at time code [00:05:00:15] is [00].

The 29th and 30th lines indicate the correspondence between 59.94i time code and pull down phase established if the A-frame phase after 2-3 pull down processing is set to [00]. The 29th and 30th lines represent the correspondence at time code of [00:06:00:12] and the following values. More specific description will be given. On the 29th line, only the frame unit portion of the 59.94i time code is indicated on a frame-by-frame basis in the order of [12], [13], [14], [15], [16], and [17]. On the 30th line, the pull down phase is indicated in the order of [00], [01], [02], [03], [04], and [00] in correspondence with the time code on the 29th line. This indicates the following: the pull down phase at time code [00:06:00:12] is [00]; the pull down phase at time code [00:06:00:13] is [01]; the pull down phase at time code [00:06:00:14] is [02]; the pull down phase at time code [00:06:00:15] is [03]; the pull down phase at time code [00:06:00:16] is [04]; and the pull down phase at time code [00:06:00:17] is [00].

The 33rd and 34th lines indicate the correspondence between 59.94i time code and pull down phase established if the A-frame phase after 2-3 pull down processing is set to [00]. The 33rd and 34th lines represent the correspondence at time code of [00:07:00:14] and the following values. More specific description will be given. On the 33rd line, only the frame unit portion of the 59.94i time code is indicated on a frame-by-frame basis in the order of [14], [15], [16], [17], [18], and [19]. On the 34th line, the pull down phase is indicated in the order of [00], [01], [02], [03], [04], and [00] in correspondence with the time code on the 33rd line. This indicates the following: the pull down phase at time code [00:07:00:14] is [00]; the pull down phase at time code [00:07:00:15] is [01]; the pull down phase at time code [00:07:00:16] is [02]; the pull down phase at time code [00:07:00:17] is [03]; the pull down phase at time code [00:07:00:18] is [04]; and the pull down phase at time code [00:07:00:19] is [00].

The 37th and 38th lines indicate the correspondence between 59.94i time code and pull down phase established if the A-frame phase after 2-3 pull down processing is set to [00]. The 37th and 38th lines represent the correspondence at time code of [00:08:00:16] and the following values. More specific description will be given. On the 37th line, only the frame unit portion of the 59.94i time code is indicated on a frame-by-frame basis in the order of [16], [17], [18], [19], [20], and [21]. On the 38th line, the pull down phase is indicated in the order of [00], [01], [02], [03], [04], and [00] in correspondence with the time code on the 37th line. This indicates the following: the pull down phase at time code [00:08:00:16] is [00]; the pull down phase at time code [00:08:00:17] is [01]; the pull down phase at time code [00:08:00:18] is [02]; the pull down phase at time code [00:08:00:19] is [03]; the pull down phase at time code [00:08:00:20] is [04]; and the pull down phase at time code [00:08:00:21] is [00].

The 41st and 42nd lines indicate the correspondence between 59.94i time code and pull down phase established if the A-frame phase after 2-3 pull down processing is set to [00]. The 41st and 42nd lines represent the correspondence at time code of [00:09:00:18] and the following values. More specific description will be given. On the 41st line, only the frame unit portion of the 59.94i time code is indicated on a frame-by-frame basis in the order of [18], [19], [20], [21], [22], and [23]. On the 42nd line, the pull down phase is indicated in the order of [00], [01], [02], [03], [04], and [00] in correspondence with the time code on the 41st line. This indicates the following: the pull down phase at time code [00:09:00:18] is [00]; the pull down phase at time code [00:09:00:19] is [01]; the pull down phase at time code [00:09:00:20] is [02]; the pull down phase at time code [00:09:00:21] is [03]; the pull down phase at time code [00:09:00:22] is [04]; and the pull down phase at time code [00:09:00:23] is [00].

The 45th and 46th lines indicate the correspondence between 59.94i time code and pull down phase established if the A-frame phase after 2-3 pull down processing is set to [00]. The 45th and 46th lines represent the correspondence at time code of [00:10:00:18] and the following values. More specific description will be given. On the 45th line, only the frame unit portion of the 59.94i time code is indicated on a frame-by-frame basis in the order of [18], [19], [20], [21], [22], and [23]. On the 46th line, the pull down phase is indicated in the order of [00], [01], [02], [03], [04], and [00] in correspondence with the time code on the 45th line. This indicates the following: the pull down phase at time code [00:10:00:18] is [00]; the pull down phase at time code [00:10:00:19] is [01]; the pull down phase at time code [00:10:00:20] is [02]; the pull down phase at time code [00:10:00:21] is [03]; the pull down phase at time code [00:10:00:22] is [04]; and the pull down phase at time code [00:10:00:23] is [00].

Here, consideration will be given to inverse 2-3 pull down processing for drop frame illustrated in FIG. 24 and FIG. 25. To carry out inverse 2-3 pull down processing with accuracy, the pull down phase of each frame must be identified. In case of non-drop frame, the pull down phase can be identified by Expression (1) mentioned above. In case of drop frame, however, the pull down phase cannot be determined simply by substituting values into Expression (1) because some time code values are thinned out (dropped).

If attention is focused on the pull down phase here, the following will be found: the pull down phase periodically and repeatedly takes values of [00] to [04]. For example, the pull down phase takes values of [00], [01], [02], [03], [04], [00], [01], [02], [03], [04], . . . . Consequently, the pull down phase can be determined by the following procedure: the 59.94i time code is converted into the number of frames, and then the value of A-frame phase is subtracted from the number of frames. Further, the resultant value is divided by the value of pull down cycle. The remainder obtained at this time is the pull down phase.

Consequently, an expression for converting the 59.94i time code into the number of frames will be presented first below.

$$NFdf = (HH \times 108000 + MM \times 1800 + SS \times 30 + FF) - \{HH \times 6 + (MM \text{ div } 10) \times 18 + (MM \text{ mod } 10) \times 2\} \quad (2)$$

In Expression (2), however, NFdf represents the number of frames to be found; HH represents the value of the hour unit portion of 59.94i time code; MM represents the value of the minute unit portion of 59.94i time code; and SS represents the value of the second unit portion of 59.94i time code. Further, in Expression (2), (MM div 10) represents the quotient obtained when the value of the minute unit portion of 59.94i time code is divided by 10. (MM mod 10) represents the remainder obtained when the value of the minute unit portion of 59.94i time code is divided by 10. This division is a computation of the order of integer, and the computation is not carried out to the decimal level.

A case where the 59.94i time code is [00:01:00:02] will be taken as an example. The values contained in this time code are substituted into Expression (2) to convert the time code into the number of frames.

NFdf=(0×108000+1×1800+0×30 +2)−{0×6+(1 div 10)×18+(1 mod 10)×2}=(1800+2)−2=1800. Hence, the number of frames is 1800.

A case where the 59.94i time code is [00:02:00:04] will be taken as another example. The values contained in this time code are substituted into Expression (2) to convert the time code into the number of frame.

NFdf=(0×108000+2×1800+0×30+4)−{0×6+(2 div 10)×18+(2 mod 10)×2}=(3600+4)−4=3600. Hence, the number of frames is 3600.

A case where the 59.94i time code is [00:10:00:00] will be taken as a further example. The values contained in this time code are substituted into Expression (2) to convert the time code into the number of frames.

NFdf=(0×108000+10×1800+0×30+0)−{0×6+(10 div 10)×18+(10 mod 10)×2}=18000−18=17982. Hence, the number of frames is 17982.

A case where the 59.94i time code is [00:10:00:18] will be taken as a further example. The values contained in this time code are substituted into Expression (2) to convert the time code into the number of frames.

NFdf=(0×108000+10×1800+×30+18)−{0×6+(10 div 10)×18+(10 mod 10)×2}=(18000+18)−18=18000. Hence, the number of frames is 18000.

The number of frames NFdf can be determined by the following expression in place of Expression (2):

$$NFdf = (HH \times 108000 + MM \times 1800 + SS \times 30 + FF) - [\{(HH \times 60 + MM) \text{div } 10\} \times 18 + (MM \text{ mod } 10) \times 2] \quad (3)$$

The number of frames NFdf can be determined also by Expression (3).

After the number of frames NFdf is determined by Expression (2) or (3), the value of A-frame phase AP is subtracted from the number of frames. Then, the computed value (NFdf−AP) is divided by the pull down cycle PC. The remainder obtained at this time is the pull down phase.

In case of drop frame, as mentioned above, the pull down phase can be computed by the following expression:

$$PP=\{(NFdf-AP) \bmod PC\} \quad (4)$$

As mentioned above, the pull down phase of each frame in moving image data which underwent 2-3 pull down processing can be identified with respect to drop frame as well. Therefore, when inverse 2-3 pull down processing is carried out later, the repeat fields and the like can be identified with accuracy. As a result, inverse 2-3 pull down processing can be carried out with accuracy, and degradation in picture quality can be prevented during inverse 2-3 pull down.

Next, referring to the flowchart in FIG. 26, description will be given to the inverse 2-3 pull down processing carried out by the inverse 2-3 pull down processing equipment 16.

At Step 201, the NRT metadata processing unit 126 reads the NRT metadata file out of the optical disk 2 through the drive 103, and acquires attributes related to video format. The attributes related to video format is described, for example, on the 21st line in FIG. 21 to the 3rd line in FIG. 22. Therefore, the NRT metadata processing unit 126 acquires the contents of the description on the 21st line in FIG. 21 to the 3rd line in FIG. 22. The NRT metadata processing unit 126 supplies the acquired attributes related to video format to the phase identification unit 124.

At Step 202, the decoding unit 121 reads the moving image data files out of the optical disk 2 through the drive 103, and decodes the moving image data file read. Then, the unit 121 outputs the decoded moving image data to the frame conversion unit 122.

At Step 203, the phase identification unit 124 reads the RT metadata out of the optical disk 2 through the drive 103 which RT metadata corresponds to the frames in the moving image data read out at Step 202. Thus, the unit 124 acquires the LTC in the RT metadata corresponding to the top frame of the frames in a series of the moving image data. Then, the phase identification unit 124 converts the acquired LTC into the number of frames. The LTC includes a flag indicating whether the data is of drop frame or of non-drop frame. Therefore, the phase identification unit 124 judges whether the data is of drop frame or of non-drop frame based on the flag. In case of drop frame, the unit 124 converts the LTC into the number of frames by Expression (2) or (3) mentioned above. If the judgment of non-drop frame is made based on the flag included in the LTC, the phase identification unit 124 takes the value of the frame unit portion of the LTC as the number of frames.

At Step 204, the phase identification unit 124 determines the pull down phase of the top frame with which inverse 2-3 pull down processing is started based on the following: the number of frames determined at Step 203; the description related to A-frame phase included in the attributes of video format supplied from the NRT metadata processing unit 126; and the pull down cycle. More specific description will be given. The number of frames is determined at Step 203, and the description related to A-frame phase (e.g. [aFramePhase="00"] on the 1st line in FIG. 22) is supplied from the NRT metadata processing unit 126. Further, the pull down cycle is known. Therefore, the pull down phase of the top frame with which inverse 2-3 pull down processing is started can be determined utilizing these pieces of data.

In case of non-drop frame, the phase identification unit 124 acquired the value of frame unit portion FF at Step 203. Therefore, the unit 124 determines the pull down phase PP by Expression (1). In case of drop frame, the phase identification unit 124 determined the number of frames to the top frame with which inverse 2-3 pull down is started, at Step 203. Therefore, the unit 124 determines the pull down phase PP by Expression (4).

The phase identification unit 124 notifies the frame conversion unit 122 of the determined pull down phase of the top frame with which inverse 2-3 pull down is started.

As illustrated in FIG. 4, for example, the pull down cycle is repeated. Therefore, the pull down phase of the second and following frames can be uniquely identified if the pull down phase of the top frame with which inverse 2-3 pull down is started, determined at Step 204, is identified. At Step 205, consequently, the frame conversion unit 122 successively identifies the pull down phase of the second and following frames based on the pull down phase of the top frame. Then, the unit 122 carries out inverse 2-3 pull down based on the identified pull down phase.

If the identified pull down phase is pull down phase [00] in FIG. 4, the following takes place: the frame conversion unit 122 adopts the top fields and bottom fields of the frames of the pull down phase [00] as top fields t0 and bottom fields b0, respectively, in the 24p moving image data. If the identified pull down phase is pull down phase [01] in FIG. 4, the following takes place: the frame conversion unit 122 adopts the top fields and bottom fields of the frames of the pull down phase [01] as top fields t1 and bottom fields b1, respectively, in the 24p moving image data. If the identified pull down phase is pull down phase [02] in FIG. 4, the following takes place: the frame conversion unit 122 does not adopt the top fields of the frames of the pull down phase [02] because they are repeat fields. However, the unit 122 adopts only the bottom fields of the pull down phase [02] as bottom fields b2 in the 24p moving image data. If the identified pull down phase is pull down phase [03] in FIG. 4, the frame conversion unit 122 adopts the top fields of the frames of the pull down phase [03] as top fields t2 in the 24p moving image data. Further, the unit 122 adopts the bottom fields of the frames of the pull down phase [03] as bottom fields b3 in the 24p moving image data. If the identified pull down phase is pull down phase [04] in FIG. 4, the frame conversion unit 122 adopts only the top fields of the frames of the pull down phase [04] as top fields t3 in the 24p moving image data. However, the unit 122 does not adopt the bottom fields of the frame of the pull down phase [04] because they are repeat field.

As mentioned above, 24p moving image data is generated from 60i (or 59.94i) moving image data by inverse 2-3 pull down. The frame conversion unit 122 supplies the 24p moving image data generated by inverse 2-3 pull down to the encoding unit 123 and the low resolution data generation unit 125.

When inverse 2-3 pull down has been carried out on frames equivalent to one pull down cycle, the frame conversion unit 122 informs the RT metadata processing unit 127 of that.

At Step 206, the encoding unit 123 encodes the 24p moving image data supplied from the frame conversion unit 122 by such an encoding method as MPEG2. Further, the low resolution data generation unit 125 generates low resolution data from the 24p moving image data supplied from the frame conversion unit 122.

As mentioned above, the RT metadata processing unit 127 receives the notification that inverse 2-3 pull down has been carried out by an amount equivalent to one pull down cycle from the frame conversion unit 122. Then, at Step 207, the unit 127 generates 24p time code for each of all the frames equivalent to the pull down cycle, and generates RT metadata including the generated 24p time code for each frame.

At Step 208, the NRT metadata processing unit 126 generates NRT metadata.

At Step 209, the management file processing unit 128 creates a clip information file. The management file processing unit 128 also creates a picture pointer file.

At Step 210, the inverse 2-3 pull down processing unit 94 supplies the drive 104 with the following in predetermined order: the 24p moving image data encoded by the encoding unit 123; the low resolution data generated by the low resolution data generation unit 125; the RT metadata generated by the RT metadata processing unit 127; the NRT metadata generated by the NRT metadata processing unit 126; and the clip information file and picture pointer file created by the management file processing unit 128. The drive 104 records the supplied data in the predetermined physical areas on the optical disk 3.

Inverse 2-3 pull down processing is carried out as mentioned above.

As mentioned above, the present invention is so constituted that: in 2-3 pull down processing, time code and A-frame phase are recorded, and in inverse 2-3 pull down processing, the pull down phase of each frame is identified based on the time code and the A-frame phase. Therefore, inverse 2-3 pull down processing can be carried out with accuracy. If the A-frame phase is recorded; the pull down phase can be identified with accuracy during inverse 2-3 pull down processing. This can be done even if the pull down phase is not recorded for all the frames during 2-3 pull down processing.

The above description has been given to a case where 2-3 pull down processing is carried out by the 2-3 pull down processing equipment 13, and inverse 2-3 pull down processing is carried out by the inverse 2-3 pull down processing equipment 16. The constitution of information processing equipment for carrying out 2-3 pull down processing and inverse 2-3 pull down processing is not limited to this. The information processing equipment may be constituted in different ways. Further, such a constitution that one piece of information processing equipment carries out both 2-3 pull down processing and inverse 2-3 pull down processing may be adopted.

Further, the above description has been given to a case where 2-3 pull down processing and inverse 2-3 pull down processing are carried out. Needless to add, the present invention may be added to other pull down processing (e.g. 2-3-3-2 pull down processing).

Further, the above description has been given to a case where a series of moving image data subjected to 2-3 pull down processing or inverse 2-3 pull down processing is all in the same A-frame phase. The present invention is applicable to cases where a series of pieces of moving image data are in a plurality of different A-frame phases. To implement this, the time code of discontinuities at which the A-frame phase is discontinuous and the correspondence table for A-frame phase are described in the NRT metadata file.

A series of the above mentioned processing can be carried out by hardware or by software. If a series of processing is performed by software, programs constituting the software are installed onto dedicated computer hardware. Or, such programs are installed onto a computer, for example, a general-purpose personal computer, capable of carrying out various functions by installing various programs, from a recording medium or the like.

Various constitutions can be adopted for the recording medium for providing programs to the users. The recording medium with the programs recorded thereon can be distributed separately from the 2-3 pull down processing equipment 13 and inverse 2-3 pull down processing equipment 16 illustrated in FIG. 2 and FIG. 10. Such recording media include: magnetic disk (including flexible disk); optical disk (including CD-ROM (Compact Disc-Read Only Memory) and DVD (Digital Versatile Disc)), magneto-optic disk (including MD (Mini-Disc) (registered trademark)); and removable medium 42, 102 including package medium comprising semiconductor memory or the like. The recording medium can be a hard disk or the like, including ROM 32, 92 and storage unit 39, 99, which stores programs and is supplied to the user as is installed in a computer.

The steps in which the programs supplied through a medium are described, in this specification can be implemented in various ways. Naturally, they can be implemented on the time series in the order in which the programs are described. The steps may be implemented in parallel or individually.

In this specification, "system" refers to the whole of equipment comprising a plurality of devices.

As mentioned above, according to the first aspect of the present invention, pull down processing can be carried out. More particularly, pull down processing can be carried out so that original video signals can be easily and accurately reproduced from video signals pulled down.

According to the second aspect of the present invention, original moving images can be reconstituted from moving images pulled down. More particularly, original video signals can be easily and accurately reproduced from video signals pulled down.

What is claimed is:

1. An information processing equipment which pulls down video signals with a predetermined number of frames taken as a cycle, comprising:

a first generating means for generating a second video signal at a second frame rate different from a first frame rate from a first video signal recorded at said first frame rate; and a second generating means for generating attribute information recorded on a recording medium together with said second video signal and comprising phase information indicating the phase within said cycle of a top frame in said second video signal, wherein the attribute information is categorized based on whether the attribute information relates to a real-time property of the second video, wherein the attribute information related to the real-time property is recorded with the second video signal as a set, wherein the attribute information not related to the real-time property is recorded in an area different from the set, wherein the attribute information related to the real-time property is recorded in a first file and the attribute information not related to the real-time property is recorded in a second file, the first file and the second file being described in different file formats, the first file being a BIM file and the second file being an XML file, wherein the attribute information not related to the real-time property includes a conversion table for associating a time code with a frame number of the second video signal, wherein the attribute information not related to the real-time property is generated based on the attribute information related to the real-time property and the phase information, and wherein the attribute information is recorded on the recording medium with a lower priority than the second video signal.

2. The information processing equipment according to claim 1, wherein said second generating means generates said attribute information further comprising pull down type information which indicates the type of said pull down carried out when said second video signal is generated from said first video signal by said first generating means.

3. The information processing equipment according to claim 1, wherein the attribute information is recorded in an area different from an area in which the second video signal is recorded.

4. An information processing method for information processing equipment which pulls down video signals with a predetermined number of frames taken as a cycle, comprising:
a first generation step of generating a second video signal at a second frame rate different from a first frame rate from a first video signal recorded at said first frame rate;
a second generation step of generating attribute information recorded on a recording medium together with said second video signal and comprising phase information indicating the phase within said cycle of a top frame in said second video signal is generated;
a categorizing step of categorizing the attribute information based on whether the attribute information relates to a real-time property of the second video;
a first recording step of recording the attribute information related to the real-time property with the second video signal as a set;
a second recording step of recording the attribute information not related to the real-time property in an area different from the set;
a third generation step of generating the attribute information not related to the real-time property based on the attribute information related to the real-time property and the phase information; and
a third recording step of recording the attribute information on the recording medium with a lower priority than the second video signal,
wherein the attribute information related to the real-time property is recorded in a first file and the attribute information not related to the real-time property is recorded in a second file, the first file and the second file being described in different file formats, the first file being a BIM file and the second file being an XML file, and
wherein the attribute information not related to the real-time property includes a conversion table for associating a time code with a frame number of the second video signal.

5. A non-transitory computer-readable medium on which an executable program for controlling, according to an information processing method, information processing equipment which pulls down video signals with a predetermined number of frames taken as a cycle is recorded, said information processing method comprising:
a first generation step of generating a second video signal at a second frame rate different from a first frame rate from a first video signal recorded at said first frame rate;
a second generation step of generating attribute information recorded on a recording medium together with said second video signal and comprising phase information indicating the phase within said cycle of a top frame in said second video signal is generated;
a categorizing step of categorizing the attribute information based on whether the attribute information relates to a real-time property of the second video;
a first recording step of recording the attribute information related to the real-time property with the second video signal as a set;
a second recording step of recording the attribute information not related to the real-time property in an area different from the set;
a third generation step of generating the attribute information not related to the real-time property based on the attribute information related to the real-time property and the phase information; and
a third recording step of recording the attribute information on the recording medium with a lower priority than the second video signal,
wherein the attribute information related to the real-time property is recorded in a first file and the attribute information not related to the real-time property is recorded in a second file, the first file and the second file being described in different file formats, the first file being a BIM file and the second file being an XML file, and
wherein the attribute information not related to the real-time property includes a conversion table for associating a time code with a frame number of the second video signal.

6. An information processing equipment that generates a second video signal not pulled down from a first video signal pulled down with a predetermined number of frames taken as a cycle, comprising:
an identifying means for identifying a phase within said cycle of a frame contained in said first video signal based on phase information indicating the phase within said cycle of a top frame in said first video signal and attribute information added to said first video signal; and
a generating means for generating said second video signal based on said phase within said cycle of said frame contained in said first video signal identified by said identifying means,
wherein the attribute information is categorized based on whether the attribute information relates to a real-time property of the first video,
wherein the attribute information related to the real-time property is recorded with the second video signal as a set,
wherein the attribute information not related to the real-time property is recorded in an area different from the set,
wherein the attribute information not related to the real-time property includes a conversion table for associating a time code with a frame number of the first video signal,
wherein the attribute information related to the real-time property is recorded in a first file and the attribute information not related to the real-time property is recorded in a second file, the first file and the second file being described in different file formats, the first file being a BIM file and the second file being an XML file,
wherein the attribute information not related to the real-time property is generated based on the attribute information related to the real-time property and the phase information, and
wherein attribute information of the first video is recorded on a recording medium with a lower priority than the first video signal.

7. The information processing equipment according to claim 6, wherein said identifying means judges whether said first video signal has a drop frame and identifies the phase within said cycle of a frame contained in said first video signal based on the result of the judgment.

8. An information processing method for information processing equipment which generates a second video signal not pulled out from a first video signal pulled down with a predetermined number of frames taken as a cycle, comprising:

an identification step of identifying a phase within said cycle of a frame contained in said first video signal based on phase information indicating the phase within said cycle of a top frame in said first video signal and attribute information added to said first video signal;

a first generation step of generating said second video signal based on said phase within said cycle of said frame contained in said first video signal identified through the processing in said identification step;

a categorizing step of categorizing the attribute information based on whether the attribute information relates to a real-time property of the second video;

a first recording step of recording the attribute information related to the real-time property with the second video signal as a set;

a second recording step of recording the attribute information not related to the real-time property in an area different from the set;

a second generation step of generating the attribute information not related to the real-time property based on the attribute information related to the real-time property and the phase information; and a third recording step of recording attribute information of the first video on a recording medium with a lower priority than the first video signal, wherein the attribute information related to the real-time property is recorded in a first file and the attribute information not related to the real-time property is recorded in a second file, the first file and the second file being described in different file formats, the first file being a BIM file and the second file being an XML file, and wherein the attribute information not related to the real-time property includes a conversion table for associating a time code with a frame number of the first video signal.

9. A non-transitory computer-readable medium on which an executable program for controlling, according to an information processing method, information processing equipment which generates a second video signal not pulled down from a first video signal pulled down with a predetermined number of frames taken as a cycle, said information processing method comprising:

an identification step of identifying a phase within said cycle of a frame contained in said first video signal based on phase information indicating the phase within said cycle of a top frame in said first video signal and attribute information added to said first video signal;

a first generation step of generating said second video signal based on said phase within said cycle of said frame contained in said first video signal identified through the processing in said identification step;

a categorizing step of categorizing the attribute information based on whether the attribute information relates to a real-time property of the second video;

a first recording step of recording the attribute information related to the real-time property with the second video signal as a set;

a second recording step of recording the attribute information not related to the real-time property in an area different from the set;

a second generation step of generating the attribute information not related to the real-time property based on the attribute information related to the real-time property and the phase information; and a third recording step of recording attribute information of the first video on a recording medium with a lower priority than the first video, wherein the attribute information related to the real-time property is recorded in a first file and the attribute information not related to the real-time property is recorded in a second file, the first file and the second file being described in different file formats, the first file being a BIM file and the second file being an XML, file, and wherein the attribute information not related to the real-time property includes a conversion table for associating a time code with a frame number of the first video signal.

* * * * *